United States Patent
Baldemair et al.

(10) Patent No.: US 12,075,260 B2
(45) Date of Patent: Aug. 27, 2024

(54) MBSFN SUBFRAME USAGE FOR LTE-NR SPECTRUM SHARING

(71) Applicant: Telefonaktiebolaget LM Ericsson (publ), Stockholm (SE)

(72) Inventors: Robert Baldemair, Solna (SE); Fredrik Huss, Sunbyberg (SE); Franz Heiser, Järfälla (SE); Gary Boudreau, Kanata (CA); Luke Williams, Scarborough (CA); Håkan Björkegren, Täby (SE); Stefan Parkvall, Bromma (SE); Oskar Mauritz, Johanneshov (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 283 days.

(21) Appl. No.: 17/426,877

(22) PCT Filed: Feb. 11, 2020

(86) PCT No.: PCT/SE2020/050136
§ 371 (c)(1),
(2) Date: Jul. 29, 2021

(87) PCT Pub. No.: WO2020/167221
PCT Pub. Date: Aug. 20, 2020

(65) Prior Publication Data
US 2022/0124510 A1 Apr. 21, 2022

Related U.S. Application Data

(60) Provisional application No. 62/805,140, filed on Feb. 13, 2019.

(51) Int. Cl.
*H04W 16/14* (2009.01)
*H04L 5/00* (2006.01)

(52) U.S. Cl.
CPC ........... *H04W 16/14* (2013.01); *H04L 5/0053* (2013.01)

(58) Field of Classification Search
None
See application file for complete search history.

(56) References Cited

U.S. PATENT DOCUMENTS 11,343,043 B2 * 5/2022 Kwak ................... H04L 27/261
11,665,691 B2 * 5/2023 Wong ..................... H04W 88/10
370/329

(Continued)

FOREIGN PATENT DOCUMENTS

CN 101540952 A 9/2009
WO 2017173133 A1 10/2017

(Continued)

OTHER PUBLICATIONS

Japanese Notice of Reasons for Rejection with English Machine Translation dated Aug. 23, 2022 for Patent Application No. 2021-546694, consisting of 6-pages.

(Continued)

*Primary Examiner* — Kodzovi Acolatse
(74) *Attorney, Agent, or Firm* — Weisberg I.P. Law, P.A.

(57) ABSTRACT

A method and apparatus are disclosed for LTE-NR spectrum sharing. In one embodiment, a method for a wireless device (WD) includes obtaining a configuration of at least one reference signal of a first radio access technology that overlaps in time with a Multimedia Broadcast Multicast Service Single Frequency Network, MBSFN, subframe of a second radio access technology. In another embodiment, a method for a network node includes configuring at least one reference signal of a first radio access technology to overlap in time with a MBSFN subframe of a second radio access technology.

15 Claims, 15 Drawing Sheets

(56) References Cited

U.S. PATENT DOCUMENTS

| | | | |
|---|---|---|---|
| 2014/0064133 | A1 | 3/2014 | Kazmi et al. |
| 2015/0036653 | A1* | 2/2015 | Kim .................. H04L 5/0005 |
| | | | 370/330 |
| 2018/0070369 | A1 | 3/2018 | Papasakellariou |
| 2018/0192404 | A1* | 7/2018 | Maaref ............ H04W 72/0453 |
| 2018/0248642 | A1* | 8/2018 | Si ..................... H04J 11/0076 |
| 2018/0324678 | A1* | 11/2018 | Chen ..................... H04W 8/08 |
| 2018/0367985 | A1 | 12/2018 | Novlan et al. |
| 2018/0376343 | A1* | 12/2018 | Harada ............. H04L 27/0006 |
| 2019/0089498 | A1* | 3/2019 | Pelletier ................. H04L 5/005 |
| 2019/0141696 | A1* | 5/2019 | Kim ..................... H04L 5/0055 |
| 2019/0150161 | A1* | 5/2019 | Cheng ................ H04W 72/542 |
| | | | 370/330 |
| 2020/0287607 | A1* | 9/2020 | Noh ......................... H04L 5/00 |
| 2022/0124711 | A1* | 4/2022 | Zhou ..................... H04W 16/14 |

FOREIGN PATENT DOCUMENTS

| | | | | |
|---|---|---|---|---|
| WO | WO-2017173133 | A1 * | 10/2017 | ............. H04L 5/003 |
| WO | 2020165842 | A1 | 8/2020 | |

OTHER PUBLICATIONS

Bgpp TSG-RAN WG2 NR Ad hoc 0118 R2-1800145; Title: NR measurement results of LTE measurement report; Agenda Item: 10.4.2.2; Source: CATT; Document for: Discussion and Decision; Date and Location: Jan. 22-26, 2018, Vancouver, Canada, consisting of 4 pages.

3GPP TSG-RAN WG1 Meeting #95 R1-1814313; Title: Summary for UE Power Saving Evaluation Methodology; Agenda Item: 7.2.9.1; Source: Qualcomm Incorporated; Document for: Discussion/Decision; Date and Location: Nov. 12-16, 2018, Spokane, Washington, USA, consisting of 30 pages.

3GPP TSG-RAN WG4 Meeting #84 R4-1707416; Title: On quality based measurement of SS blocks for NR; Agenda Item: 9.6.7.2; Source: Intel Corporation; Document for: Discussion; Date and Location: Aug. 21-25, 2017, Berlin, Germany, consisting of 10 pages.

EPO Communication with Supplementary European Search Report dated Sep. 30, 2022 for Patent Application No. 20755074.0, consisting of 9-pages.

International Search Report and Written Opinion dated May 28, 2020 for International Application No. PCT/SE2020/050136 filed Feb. 11, 2020, consisting of 12-pages.

3GPP RAN WG4 Meeting #94-e R4-2000086; Title: Introduction of LTE/NR spectrum sharing in band 48/n48 frequency range; Agenda Item: 9.23.2; Source: Apple Inc.; WI/SI: NR_n48_LTE_48_coex-Core; Release: Rel-16; Document for: Decision; Date and Location: Feb. 24-Mar. 6, 2020, Electronic meeting, consisting of 9-pages.

3GPP TSG RAN WG1 Meeting #88 R1-1702252; Title: Remaining LTE-NR coexistence issues and handling; Agenda Item: 8.1.8; Source: Intel Corporation; Document for: Discussion and Decision; Date and Location: Feb. 13-17, 2017, Athens, Greece, consisting of 5-pages.

Korean Notice of Preliminary Rejection and English summary dated Apr. 15, 2024 for Application No. 2021-7019866, consisting of 7 pages.

3GPP TSG-RAN1 NR AH#3 R1-1716522; Title: On different deployments and SS SCS combinations; Title: On different deployments and SS SCS combinations; Source: Nokia, Nokia Shanghai Bell; Document for: Discussion and Decision; Location and Date: Nagoya, Japan, Sep. 18-21, 2017, consisting of 4 pages.

3GPP TSG RAN WG1 Meeting #90 R1-1712822; Title: Remaining issues on SS block and SS burst set composition; Source: vivo; Agenda Item: 6.1.1.1.1; Document for: Discussion and Decision; Location and Date: Prague, Czech Rep, Aug. 21-25, 2017, consisting of 3 pages.

Chinese Office Action with English summary translation dated Mar. 12, 2024 for Patent Application No. 202080014168.1, consisting of 12 pages.

* cited by examiner

FIG. 1

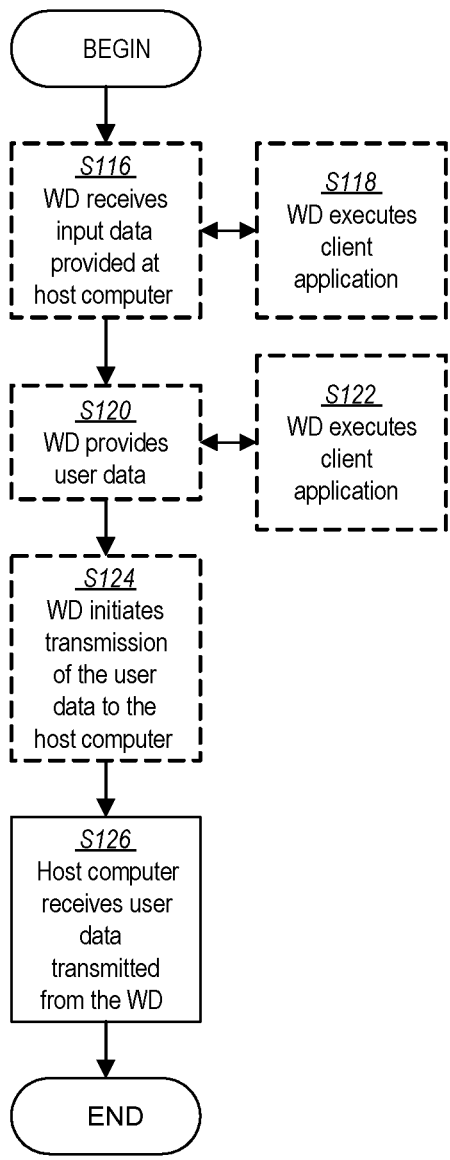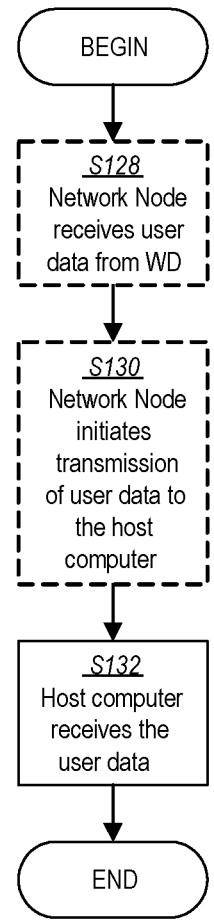
FIG. 9
FIG. 10

MBSFN SUBFRAME USAGE FOR LTE-NR SPECTRUM SHARING

CROSS-REFERENCE TO RELATED APPLICATIONS

The application is a Submission under 35 U.S.C. § 371 for U.S. National Stage Patent Application of International Application No.: PCT/SE2020/050136, filed Feb. 11, 2020 entitled "MBSFN SUBFRAME USAGE FOR LTE-NR SPECTRUM SHARING," which claims priority to U.S. Provisional Application No.: 62/805,140, filed Feb. 13, 2019, entitled "MBSFN SUBFRAME USAGE FOR LTE-NR SPECTRUM SHARING," the entireties of both of which are incorporated herein by reference.

TECHNICAL FIELD

The present disclosure relates to wireless communications, and in particular, to Multimedia Broadcast Multicast Service Single Frequency Network (MBSFN) subframe usage for Third Generation Partnership Project (3GPP) Long Term Evolution (LTE)-New Radio (NR) spectrum sharing.

BACKGROUND

3GPP LTE (hereinafter "LTE") uses an orthogonal frequency division multiplexing (OFDM) numerology of 15 kHz. On the other hand, 3GPP NR (hereinafter "NR") is a variable numerology system that can operate with multiple numerologies in the form of subcarrier spacing $\Delta f=15 \cdot 2^\mu$ kHz with $\mu$ being the numerology parameter. NR supports for data channel numerology parameters $\mu=0, 1, 2$ for below 6 GHz. For $\mu=0$, NR and LTE numerology are identical, i.e., NR and LTE use the same subcarrier spacing of 15 kHz and even the cyclic prefix is the same.

NR supports different and wider transmission bandwidths than LTE does; however, this may not impact orthogonality between an LTE and an NR waveform if they occupy different subcarriers, or more generally resource elements. Based on this basic orthogonality between LTE and NR waveform, it may be considered to share a carrier between NR and LTE and assign different resource elements to them to obtain orthogonality.

Resource elements (REs) may be grouped into resource blocks (RBs). A resource blocks may occupy 12 subcarriers (both in LTE and NR).

CRS in LTE

Cell Specific Reference Signals (CRSs) are downlink (DL) reference signals that may occur every sixth ($6^{th}$) subcarrier per antenna port in LTE. Which of the possible 6-comb is used by CRS can be derived from the physical layer cell identity (ID). The inserted direct current (DC) subcarrier may interrupt the regular 6-comb in LTE, an example of which is shown in FIG. 1. FIG. 1 illustrates an example of a time-frequency grid of LTE CRS for 4 CRS antenna ports (used resource elements for all four antenna ports are shown in the same time-frequency grid and the numbers shown in FIG. 1 indicate the CRS antenna port). The CRS signal of one antenna port occurs every 6th subcarrier and, as shown in FIG. 1, the DC subcarrier may interrupt this regular comb.

In some cases, NR signals and LTE signals may be configured with care to avoid unnecessary performance degradation when sharing wireless communication spectrum.

SUMMARY

Some embodiments advantageously provide methods and apparatuses for MBSFN subframe usage for Long Term Evolution (LTE)-New Radio (NR) spectrum sharing.

According to one aspect, a method implemented in a network node is provided. The method comprises configuring at least one reference signal of a first radio access technology to overlap in time with a Multimedia Broadcast Multicast Service Single Frequency Network, MBSFN, subframe of a second radio access technology.

According to another aspect, a method implemented in a wireless device (WD) is provided. The method comprises obtaining a configuration of at least one reference signal of a first radio access technology that overlaps in time with a MBSFN subframe of a second radio access technology.

According to an aspect of the present disclosure, a network node configured to communicate with a wireless device is provided. The network node includes processing circuitry. The processing circuitry is configured to cause the network node to configure at least one reference signal of a first radio access technology to overlap in time with a Multimedia Broadcast Multicast Service Single Frequency Network, MBSFN, subframe of a second radio access technology.

In some embodiments of this aspect, the processing circuitry is further configured to cause the network node to transmit the at least one reference signal on at least one radio resource according to the configured overlap in time; and receive feedback based on measurements of the at least one reference signal on the at least one radio resource. In some embodiments of this aspect, the at least one reference signal of the first radio access technology includes at least one of a channel state information reference signal, CSI-RS, and a tracking reference signal, TRS. In some embodiments of this aspect, the at least one reference signal of the first radio access technology includes a synchronization signal block, SSB.

In some embodiments of this aspect, the first radio access technology is Third Generation Partnership Project, 3GPP, New Radio, NR, and the second radio access technology is 3GPP Long Term Evolution, LTE. In some embodiments of this aspect, the processing circuitry is further configured to cause the network node to configure the at least one reference signal of the first radio access technology to overlap in time with the MBSFN subframe of the second radio access technology by being configured to cause the processing circuitry to cause the network node to configure the at least one reference signal of the first radio access technology in at least one slot defined by the first radio access technology to overlap with at least one subframe defined by the second radio access technology.

In some embodiments of this aspect, the processing circuitry is further configured to cause the network node to configure the at least one reference signal of the first radio access technology to overlap in time with the MBSFN subframe of the second radio access technology by being configured to cause the processing circuitry to cause the network node to configure the at least one reference signal of the first radio access technology in one of one slot and at least two slots defined by the first radio access technology to overlap with one subframe defined by the second radio access technology, the one of the one slot and the at least two slots being based at least in part on a subcarrier spacing that is used for the first radio access technology.

In some embodiments of this aspect, the processing circuitry is further configured to cause the network node to configure a synchronization signal block, SSB, of the first radio access technology to overlap in time with the MBSFN subframe of the second radio access technology; and transmit the SSB on at least one radio resource according to the configured overlap in time. In some embodiments of this aspect, the configuration of the at least one reference signal of the first radio access technology to overlap in time with the MBSFN subframe of the second radio access technology is further configured to cause the network node to avoid a collision of the at least one reference signal of the first radio access technology with at least one of a cell-specific reference signal, CRS, of the second radio access technology; and signaling on one of a first one and a first two orthogonal frequency division multiplexing, OFDM, symbols of the MBSFN subframe of the second radio access technology.

According to another aspect of the present disclosure, a wireless device, WD, configured to communicate with a network node is provided. The wireless device includes processing circuitry. The processing circuitry is configured to cause the wireless device to obtain a configuration of at least one reference signal of a first radio access technology to overlap in time with a Multimedia Broadcast Multicast Service Single Frequency Network, MBSFN, subframe of a second radio access technology.

In some embodiments of this aspect, the processing circuitry is further configured to cause the wireless device to receive and/or perform measurements of the at least one reference signal on at least one radio resource according to the configured overlap in time. In some embodiments of this aspect, the at least one reference signal of the first radio access technology includes at least one of a channel state information reference signal, CSI-RS, and a tracking reference signal, TRS. In some embodiments of this aspect, the at least one reference signal of the first radio access technology includes a synchronization signal block, SSB. In some embodiments of this aspect, the first radio access technology is Third Generation Partnership Project, 3GPP, New Radio, NR, and/or the second radio access technology is Third Generation Partnership Project, 3GPP, Long Term Evolution, LTE.

In some embodiments of this aspect, the overlap in time is an overlap of the at least one reference signal in at least one slot defined by the first radio access technology with at least one subframe defined by the second radio access technology. In some embodiments of this aspect, the overlap in time is an overlap of the at least one reference signal of the first radio access technology in one of one slot and at least two slots defined by the first radio access technology with one subframe defined by the second radio access technology, the one of the one slot and the at least two slots being based at least in part on a subcarrier spacing that is used for the first radio access technology.

In some embodiments of this aspect, the processing circuitry is further configured to obtain a configuration of a synchronization signal block, SSB, of the first radio access technology to overlap in time with the MBSFN subframe of the second radio access technology; and receive the SSB on at least one radio resource according to the configured overlap in time. In some embodiments of this aspect, the overlap in time is configured to avoid a collision of the at least one reference signal of the first radio access technology with at least one of a cell-specific reference signal, CRS, of the second radio access technology; and signaling on one of a first one and a first two orthogonal frequency division multiplexing, OFDM, symbols of the MBSFN subframe of the second radio access technology.

According to yet another aspect of the present disclosure, a method implemented in a network node configured to communicate with a wireless device is provided. The method includes configuring at least one reference signal of a first radio access technology to overlap in time with a Multimedia Broadcast Multicast Service Single Frequency Network, MBSFN, subframe of a second radio access technology.

In some embodiments of this aspect, the method includes transmitting the at least one reference signal on at least one radio resource according to the configured overlap in time; and receiving feedback based on measurements of the at least one reference signal on the at least one radio resource. In some embodiments of this aspect, the at least one reference signal of the first radio access technology includes at least one of a channel state information reference signal, CSI-RS, and a tracking reference signal, TRS. In some embodiments of this aspect, the at least one reference signal of the first radio access technology includes a synchronization signal block, SSB.

In some embodiments of this aspect, the first radio access technology is Third Generation Partnership Project, 3GPP, New Radio, NR, and the second radio access technology is 3GPP Long Term Evolution, LTE. In some embodiments of this aspect, configuring the at least one reference signal of the first radio access technology to overlap in time with the MBSFN subframe of the second radio access technology further includes configuring the at least one reference signal of the first radio access technology in at least one slot defined by the first radio access technology to overlap with at least one subframe defined by the second radio access technology.

In some embodiments of this aspect, configuring the at least one reference signal of the first radio access technology to overlap in time with the MBSFN subframe of the second radio access technology further includes configuring the at least one reference signal of the first radio access technology in one of one slot and at least two slots defined by the first radio access technology to overlap with one subframe defined by the second radio access technology, the one of the one slot and the at least two slots being based at least in part on a subcarrier spacing that is used for the first radio access technology.

In some embodiments of this aspect, the method further includes configuring a synchronization signal block, SSB, of the first radio access technology to overlap in time with the MBSFN subframe of the second radio access technology; and transmitting the SSB on at least one radio resource according to the configured overlap in time. In some embodiments of this aspect, the configuration of the at least one reference signal of the first radio access technology to overlap in time with the MBSFN subframe of the second radio access technology is further configured to avoid a collision of the at least one reference signal of the first radio access technology with at least one of: a cell-specific reference signal, CRS, of the second radio access technology; and signaling on one of a first one and a first two orthogonal frequency division multiplexing, OFDM, symbols of the MBSFN subframe of the second radio access technology.

According to an aspect of the present disclosure, a method implemented in a wireless device, WD, configured to communicate with a network node is provided. The method includes obtaining a configuration of at least one reference signal of a first radio access technology to overlap in time with a Multimedia Broadcast Multicast Service Single Frequency Network, MBSFN, subframe of a second radio access technology.

In some embodiments of this aspect, the method further includes receiving and/or performing measurements of the at least one reference signal on at least one radio resource according to the configured overlap in time. In some embodiments of this aspect, the at least one reference signal of the first radio access technology includes at least one of a channel state information reference signal, CSI-RS, and a tracking reference signal, TRS. In some embodiments of this aspect, the at least one reference signal of the first radio access technology includes a synchronization signal block, SSB.

In some embodiments of this aspect, the first radio access technology is Third Generation Partnership Project, 3GPP, New Radio, NR, and/or the second radio access technology is Third Generation Partnership Project, 3GPP, Long Term Evolution, LTE. In some embodiments of this aspect, the overlap in time is an overlap of the at least one reference signal in at least one slot defined by the first radio access technology with at least one subframe defined by the second radio access technology. In some embodiments of this aspect, the overlap in time is an overlap of the at least one reference signal of the first radio access technology in one of one slot and at least two slots defined by the first radio access technology with one subframe defined by the second radio access technology, the one of the one slot and the at least two slots being based at least in part on a subcarrier spacing that is used for the first radio access technology.

In some embodiments of this aspect, the method further includes obtaining a configuration of a synchronization signal block, SSB, of the first radio access technology to overlap in time with the MBSFN subframe of the second radio access technology; and receiving the SSB on at least one radio resource according to the configured overlap in time. In some embodiments of this aspect, the overlap in time is configured to avoid a collision of the at least one reference signal of the first radio access technology with at least one of: a cell-specific reference signal, CRS, of the second radio access technology; and signaling on one of a first one and a first two orthogonal frequency division multiplexing, OFDM, symbols of the MBSFN subframe of the second radio access technology.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

Figure 1:
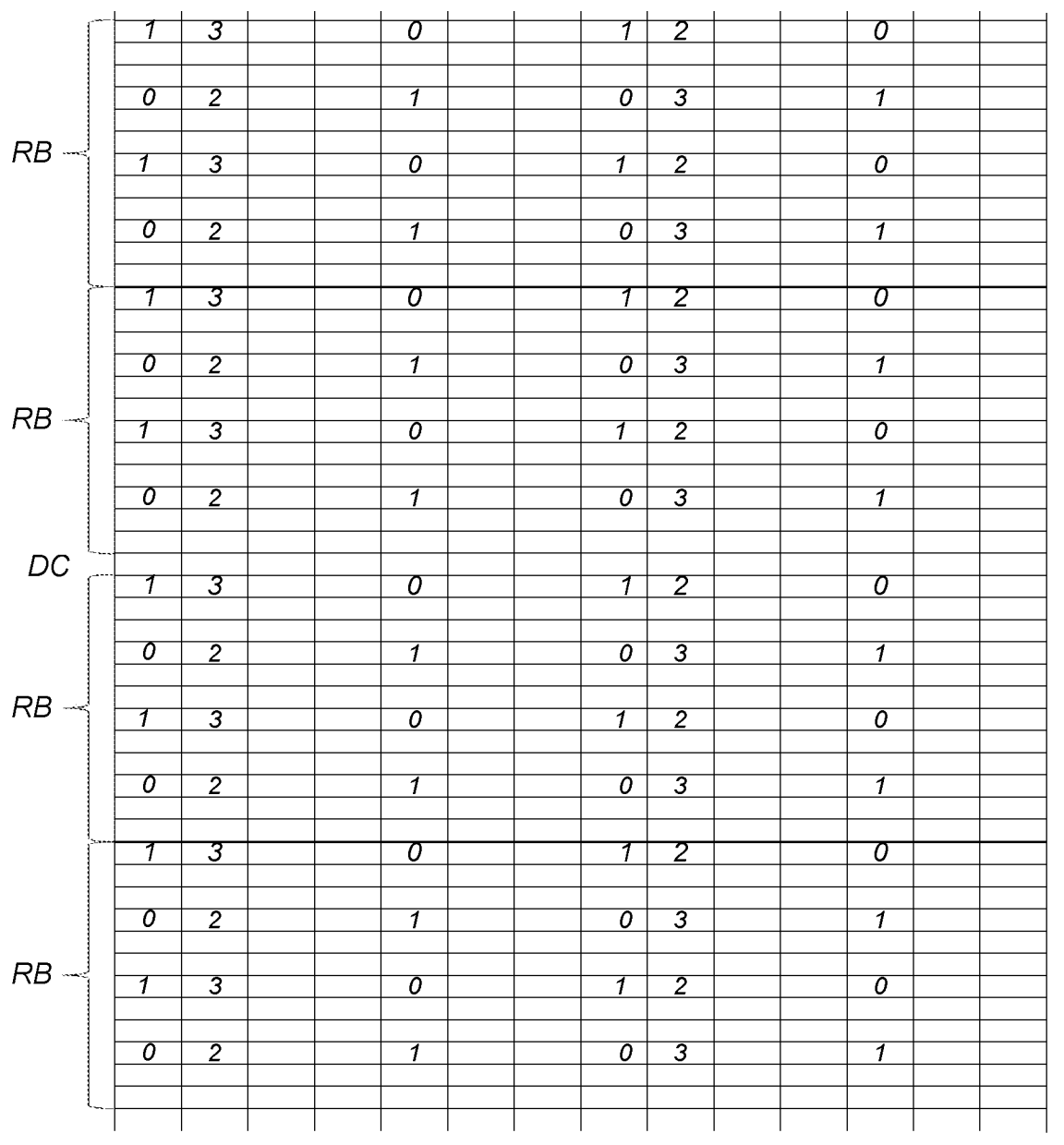

FIG. 1 illustrates an example of a time-frequency grid of LTE Cell-Specific Reference Signal (CRS) for 4 CRS antenna ports (used resource elements for all four antenna ports are shown in the same time-frequency grid);

FIG. 9 is a flowchart illustrating exemplary methods implemented in a communication system including a host computer, a network node and a wireless device for receiving user data from the wireless device at a host computer according to some embodiments of the present disclosure;

FIG. 10 is a flowchart illustrating exemplary methods implemented in a communication system including a host computer, a network node and a wireless device for receiving user data at a host computer according to some embodiments of the present disclosure;

DETAILED DESCRIPTION

MBSFN Subframes in LTE

Figure 2:
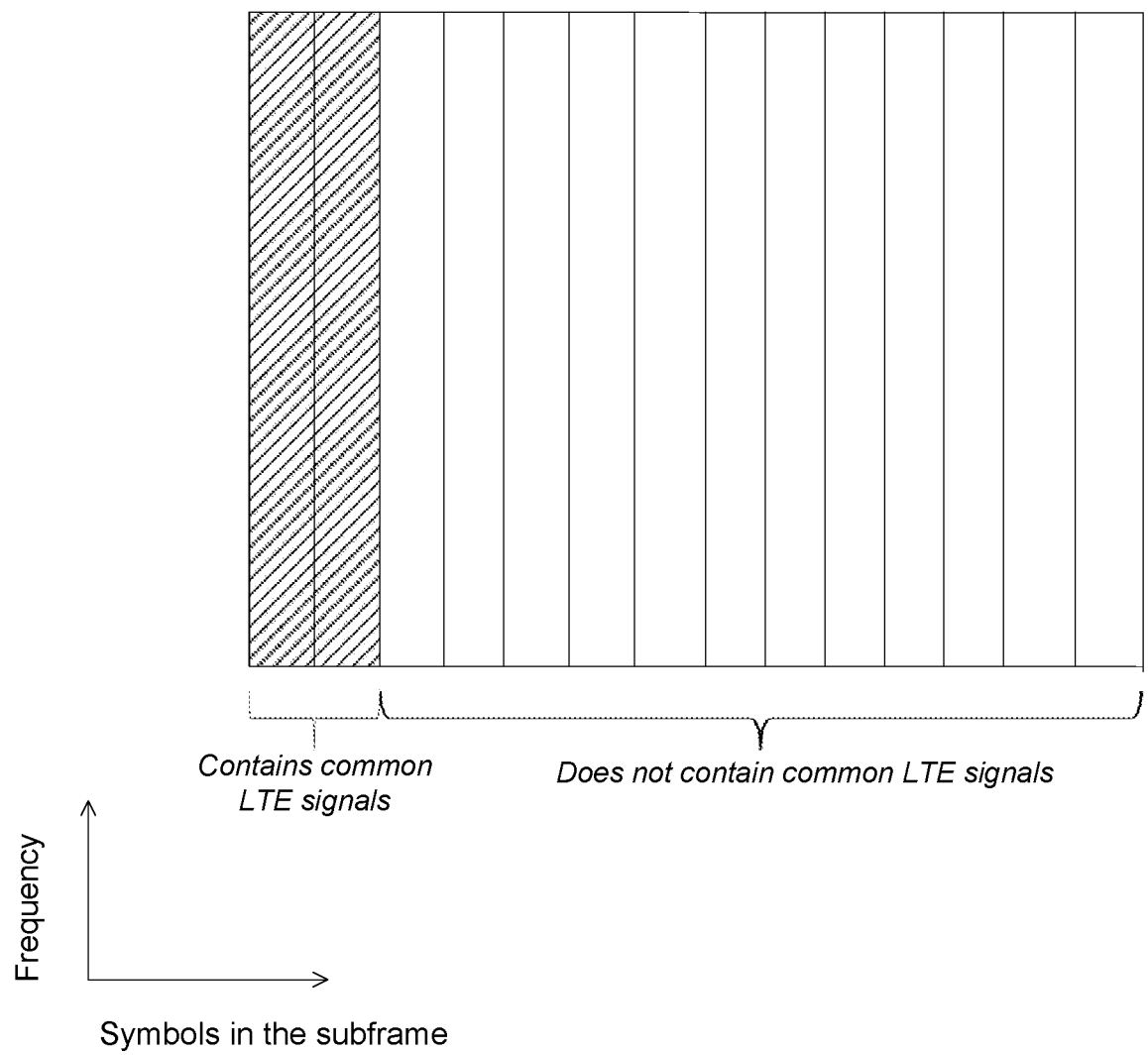
FIG. 2 illustrates an example of a MBSFN subframe.

A Multimedia Broadcast Multicast Service Single Frequency Network (MBSFN) subframe is an LTE subframe where only the first one or two OFDM symbols are occupied by LTE common signals, such as control signaling and CRS. LTE wireless devices (WDs) (e.g., user equipments) according to later LTE releases may use later symbols in an MBSFN subframe when scheduled in DL but this is controlled via scheduling. As shown in FIG. 2, which shows an example MBSFN subframe, if no LTE terminal (e.g., LTE WD) is scheduled in DL in an MBSFN subframe, only the first one or two symbols carry LTE signals. The remaining symbols of the subframe are empty, e.g. do not contain CRS that could collide with NR signals.

SSB in NR

Figure 3:
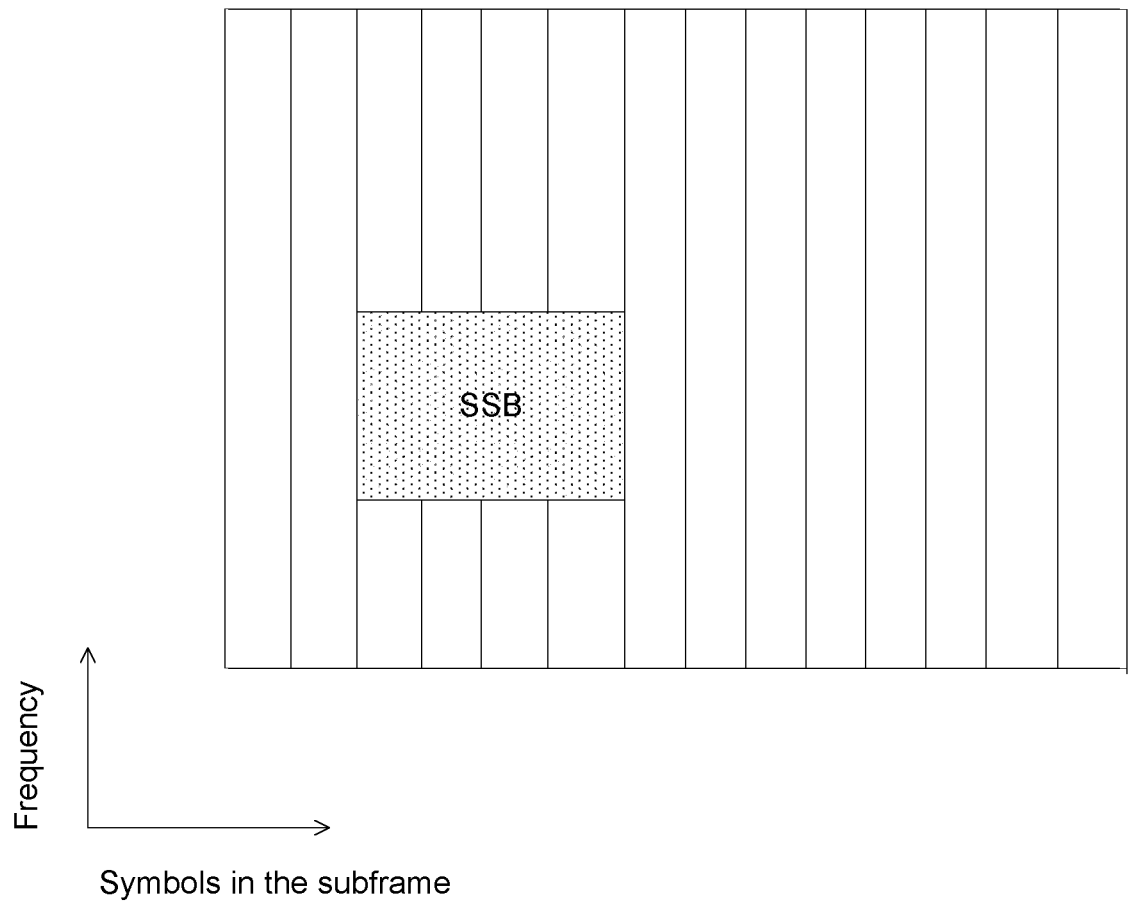
FIG. 3 illustrates an example SSB symbol allocation in a slot when sent in symbols 2-5 (where symbol counting starts with symbol 0)

The Synchronization Signal Block (SSB) is a DL signal that spans 4 symbols in NR. For example, for 15 kHz numerology, SSB can occur in symbols 2-5 or 8-11 in a slot (see e.g., FIG. 3 for an example of an SSB mapped to symbols 2-5). In any case, SSB would collide with CRS if transmitted in a slot overlapping a regular LTE subframe. To avoid such collisions one possible configuration is to transmit SSB in a slot overlapping an LTE MBSFN subframes (the LTE MBSFN subframes only contains common signals up to symbol 1 (where symbol counting starts with symbol 0)). SSB typically occurs every 20 milliseconds (ms); thus, the corresponding LTE MBSFN subframe would then also occur every 20 ms, i.e. 1 out of 20 LTE subframes would be an MBSFN subframe (5% overhead). FIG. 3 illustrates an example SSB symbol allocation in a slot when sent in symbol 2-5 (symbol counting starts with symbol 0). If LTE uses an MBSFN subframe which only contains common signals in symbols 0 and 1 collisions with LTE common signals may be avoided.

TRS in NR

Figure 4:
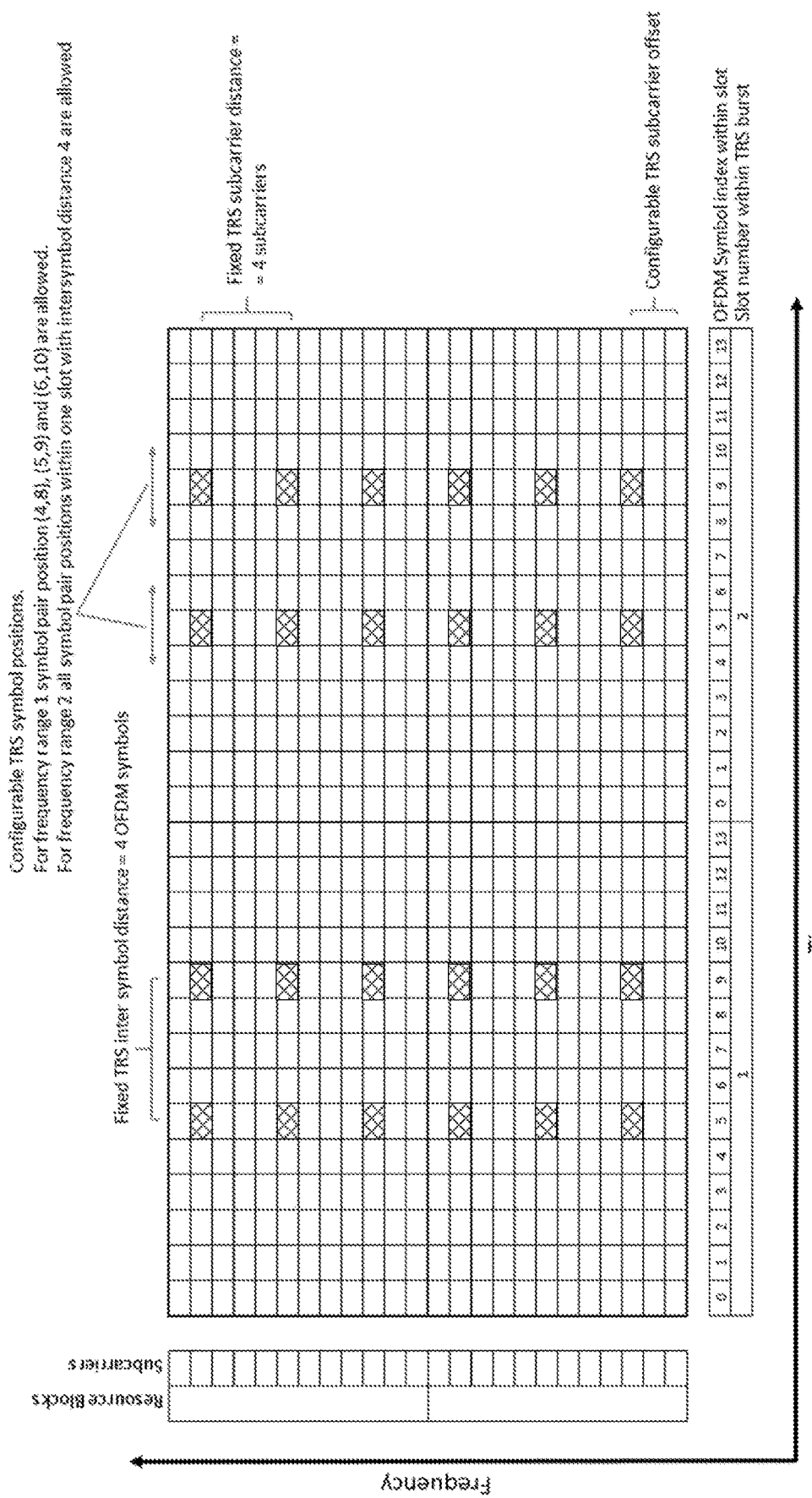
FIG. 4 illustrates an example of a TRS reference signal in symbols {5,9} (where symbol counting starts with symbol 0) of two adjacent slots.

In LTE, CRS are sent periodically which can be used by LTE WDs for, e.g., frequency offset estimation. NR does not have CRS but relies on the demodulation reference signal (DM-RS or DMRS) for demodulation instead. DM-RS are only sent when data is sent and also does not have the best structure for frequency offset estimation. Therefore, NR has an additional DL Tracking Reference Signal (TRS) which can be used for frequency tracking. TRS is sent in two adjacent slots with two symbols in each slot, as shown, for example, in FIG. 4. The symbol positions of TRS within a slot can either be {4,8}, {5,9}, or {6,10} (symbol counting starts with symbol 0). It should be noted that in the specification for NR, TRS is configured as a CSI-RS which is used specifically for tracking purposes. FIG. 4 shows the TRS reference signal in symbols {5,9} (symbol counting starts with symbol 0) of each of the two adjacent slots.

CSI-RS in NR

CSI-RS are DL reference signals that are used by NR WDs for channel state acquisition and also other purposes. The time-frequency footprint for what the CSI-RS may look like and also how often CSI-RS are transmitted can be configured in NR.

Unfortunately, in some cases, NR signals and LTE signals sharing wireless communication spectrum may degrade performance.

The presence of NR CSI-RS and/or TRS are generally not known to LTE WDs. NR TRS and CSI-RS typically span a wide bandwidth. If an LTE physical downlink shared channel (PDSCH) is scheduled in a subframe that overlaps with an NR slot containing TRS and/or CSI-RS, it may not be possible to schedule the LTE PDSCH around the NR TRS and/or CSI-RS in frequency since both NR TRS and/or CSI-RS are wideband in a typical configuration. LTE PDSCH may therefore collide with NR CSI-RS and/or TRS; and because the network (e.g., network node) may have to transmit NR CSI-RS and TRS, LTE PDSCH could be interfered with, or possibly, the corresponding LTE PDSCH resource elements would not even be transmitted (since only CSI-RS and/or TRS are sent on those resource elements). Unfortunately, this could lead to worse LTE PDSCH performance (e.g., as compared to LTE PDSCH performance without NR reference signals).

Accordingly, in some embodiments of the present disclosure, NR CSI-RS and/or TRS are placed (scheduled, allocated and/or configured) in an NR slot that overlaps in time with an LTE MBSFN subframe. In some embodiments, this may be considered especially attractive if an LTE MBSFN subframe is further configured to overlap in time with an NR slot carrying NR SSB (to avoid CRS-SSB collisions). In this case, the same MBSFN subframe may be reused, i.e. no additional overhead is introduced. Thus, in some embodiments, NR SSB, as well as, NR CSI-RS and/or TRS may be placed (scheduled, allocated and/or configured) in an NR slot overlapping in time with an LTE MBSFN subframe.

Accordingly, in some embodiments, because LTE terminals (e.g., LTE WDs) are typically not scheduled in LTE MBSFN subframes (only a later release supports that), the NR CSI-RS and TRS may not impact LTE PDSCH performance.

Before describing in detail exemplary embodiments, it is noted that the embodiments reside primarily in combinations of apparatus components and processing steps related to MBSFN subframe usage for LTE-New Radio spectrum sharing. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor or actuator equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

Although the description herein may be explained in the context of NR CSI-RS and/or TRS overlapping in time with an LTE MBSFN subframe (e.g., for purposes of avoiding collisions that may degrade LTE PDSCH, for example), it should be understood that the principles may also be applicable to other types of signals sharing spectrum, where such overlapping in time may be beneficial.

Although the description herein may be explained in the context of an NR slot overlapping in time with an LTE subframe, it should be understood that other time resources or timing structures may overlap according to the techniques disclosed herein.

Although the description herein may be explained in the context of a downlink (DL) channel (e.g., carrying CSI-RS, TRS and/or SSB), it should be understood that the principles may also be applicable to other channels, such as, for example, an uplink (UL) channel.

It should be understood that the term "overlap" as used herein may be considered to mean at least partially overlapping (e.g., a reference signal at least partially overlapping in time with an MBSFN subframe) as shown in FIGS. 13-17 for example. In other words, the term "overlap" is not intended to require the one or more reference signals to extend over the entire MBSFN subframe since a reference signal may span over only a fraction of a slot duration, again as shown in for example, the example overlapping arrangement shown in FIGS. 13-17.

Any two or more embodiments described in this disclosure may be combined in any way with each other.

Generally, it may be considered that the network, e.g. a signaling radio node and/or node arrangement (e.g., network node), configures a WD, in particular with radio resources. A resource may in general be configured with one or more messages. Different resources may be configured with different messages, and/or with messages on different layers or layer combinations. The size of a resource may be represented in symbols and/or slots and/or subcarriers and/or resource elements and/or physical resource blocks (depending on domain), and/or in number of bits it may carry, e.g. information or payload bits, or total number of bits. The radio resources may pertain to the same carrier and/or bandwidth part, and/or may be located in the same slot, or subframe or in neighboring slots.

Radio resources may have a timing structure and/or a frequency domain component. Overlapping signals may refer to signals configured, scheduled, and/or allocated and/or transmitted and/or received in the same time period/interval, or set of time resources within the timing structure (e.g., but which may be in different frequencies). The timing structure may comprise a plurality of symbols, and/or define an interval comprising several symbols (respectively their associated time intervals). A timing structure may generally comprise a plurality of symbols defining the time domain extension (e.g., interval or length or duration) of the timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot, or other time resource.

In some embodiments, control information, reference signals, and/or synchronization signals on one or more resources may be considered to be transmitted in a message having a specific format. A message may comprise or represent bits representing payload information and coding bits, e.g., for error coding.

Receiving (or obtaining) control information, reference signals, and/or synchronization signals may comprise receiving one or more control information messages or reference signals, and/or synchronization signals (e.g., via RRC signaling or via a downlink channel). It may be considered that receiving signaling comprises demodulating and/or decoding and/or detecting, e.g., blind detection of, one or more messages, in particular a message carried by the signaling, e.g., based on assumed or configured radio resources, which may be searched and/or listened for by e.g., the WD or other receiver. It may be assumed that both sides of the communication are aware of the configurations, and may determine the set of resources, e.g. based on a reference size.

Configuring a radio node, in particular a terminal or WD, may refer to the radio node being adapted or caused or set and/or instructed to operate according to the configuration (e.g., to monitor a downlink channel according to the configuration). Configuring may be done by another device, e.g., a network node (for example, a base station or gNB or eNB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency and/or time resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node (e.g., WD). Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g., WD) may comprise configuring the WD to perform certain measurements on certain subframes or radio resources and reporting such measurements according to embodiments of the present disclosure. In some embodiments, obtaining a configuration may comprise receiving configuration data from another node (e.g., network node) and performing according to the configuration data. In some embodiments, obtaining configuration data may comprise a node, such as a WD, configuring itself, e.g., according to information or data in a memory of the terminal or wireless device.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 5:
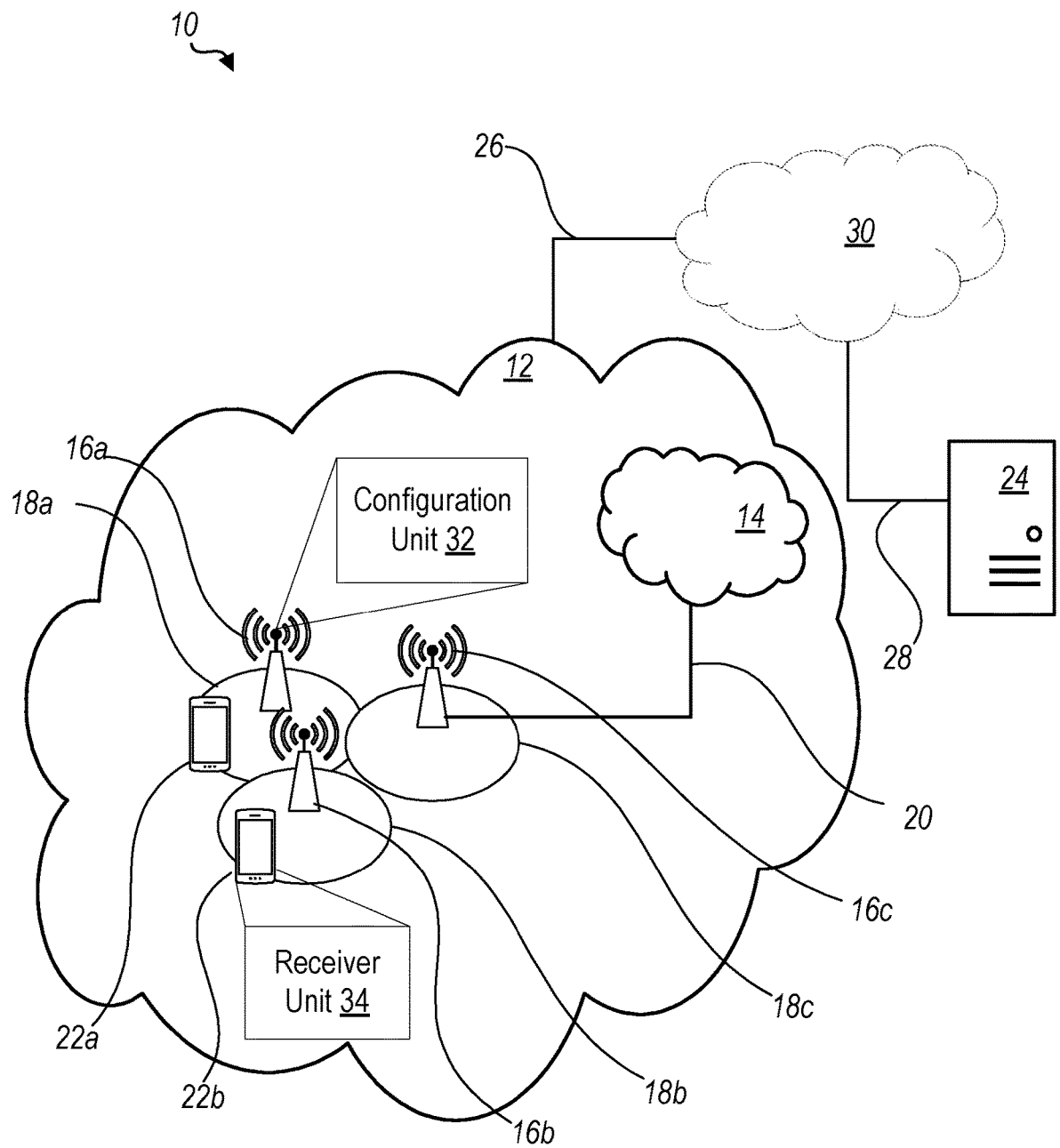
FIG. 5 is a schematic diagram of an exemplary network architecture illustrating a communication system connected via an intermediate network to a host computer according to the principles in the present disclosure.

Referring now to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to configure at least one reference signal of a first radio access technology to overlap in time with a Multimedia Broadcast Multicast Service Single Frequency Network, MBSFN, subframe of a second radio access technology. A wireless device 22 is configured to include a receiver unit 34 which is configured to obtain a configuration of at least one reference signal of a first radio access technology that overlaps in time with a Multimedia Broadcast Multicast Service Single Frequency Network, MBSFN, subframe of a second radio access technology.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to configure at least one reference signal of a first radio access technology to overlap in time with a Multimedia Broadcast Multicast Service Single Frequency Network, MBSFN, subframe of a second radio access technology.

In some embodiments, the processing circuitry 68 is configured to transmit the at least one reference signal on radio resources according to the configured overlap in time; and/or receive feedback based on measurements of the at least one reference signal on the radio resources. In some embodiments, the at least one reference signal includes at least one of a channel state information reference signal, CSI-RS, and a tracking reference signal, TRS. In some embodiments, the first radio access technology is New Radio, NR, and/or the second radio access technology is Long Term Evolution, LTE. In some embodiments, the overlap in time is an overlap of at least one slot defined by the first radio access technology and at least one subframe defined by the second radio access technology. In some embodiments, the processing circuitry is further configured to configure a synchronization signal block, SSB, of the first radio access technology to overlap in time with the MBSFN subframe of the second radio access technology; and transmit the SSB on radio resources according to the configured overlap in time.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a receiver unit 34 configured to obtain a configuration of at least one reference signal of a first radio access technology that overlaps in time with a Multimedia Broadcast Multicast Service Single Frequency Network, MBSFN, subframe of a second radio access technology.

In some embodiments, the processing circuitry 84 is configured to receive and/or perform measurements of the at least one reference signal on radio resources according to the configured overlap in time. In some embodiments, the at least one reference signal includes at least one of a channel state information reference signal, CSI-RS, and a tracking reference signal, TRS. In some embodiments, the first radio access technology is New Radio, NR, and/or the second radio access technology is Long Term Evolution, LTE. In some embodiments, the overlap in time is an overlap of at least one slot defined by the first radio access technology and at least one subframe defined by the second radio access technology. In some embodiments, the processing circuitry 84 is further configured to obtain a configuration of a synchronization signal block, SSB, of the first radio access technology to overlap in time with the MBSFN subframe of the second radio access technology; and receive the SSB on radio resources according to the configured overlap in time.

Figure 6:
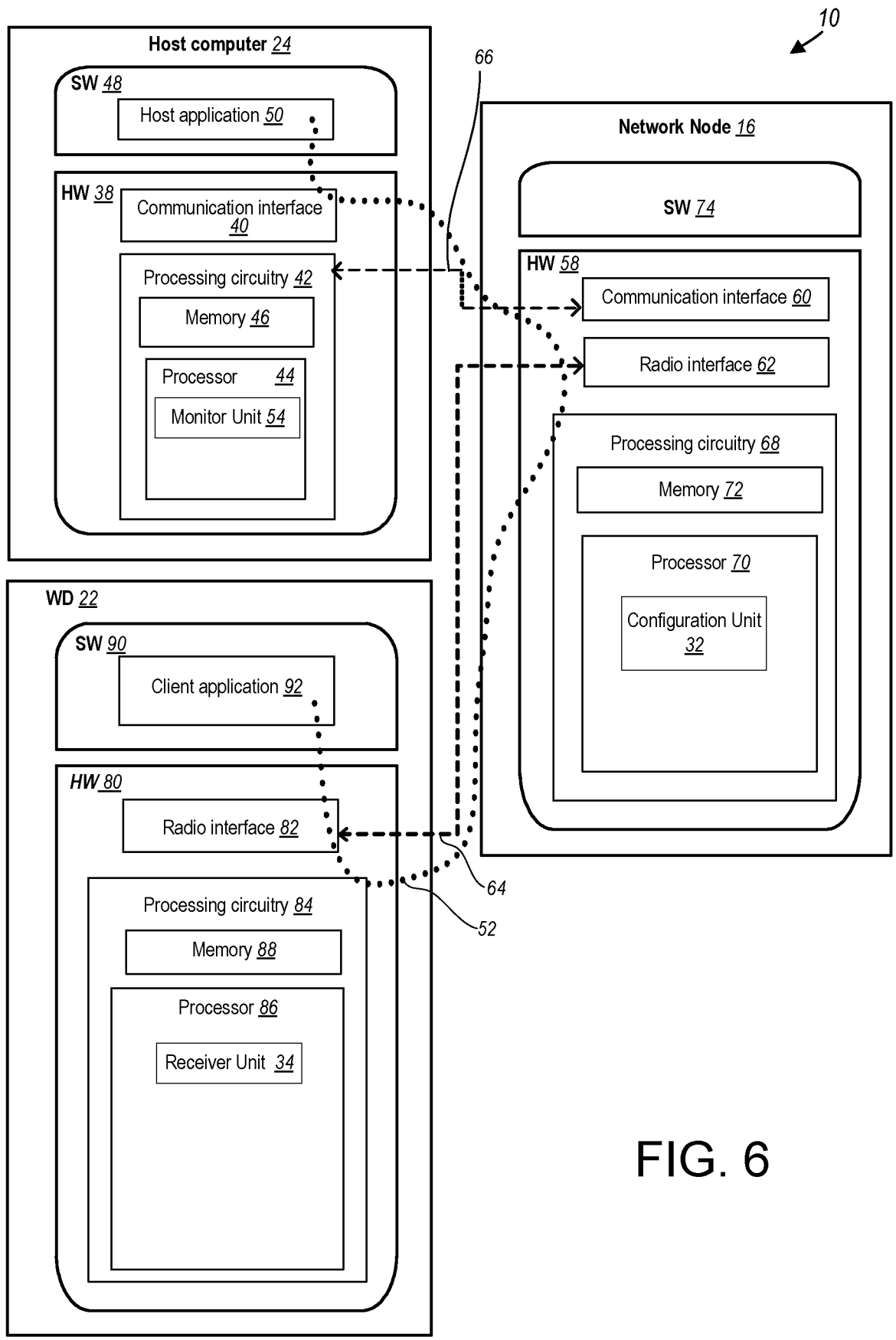
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as configuration unit 32, and receiver unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 7, 8:
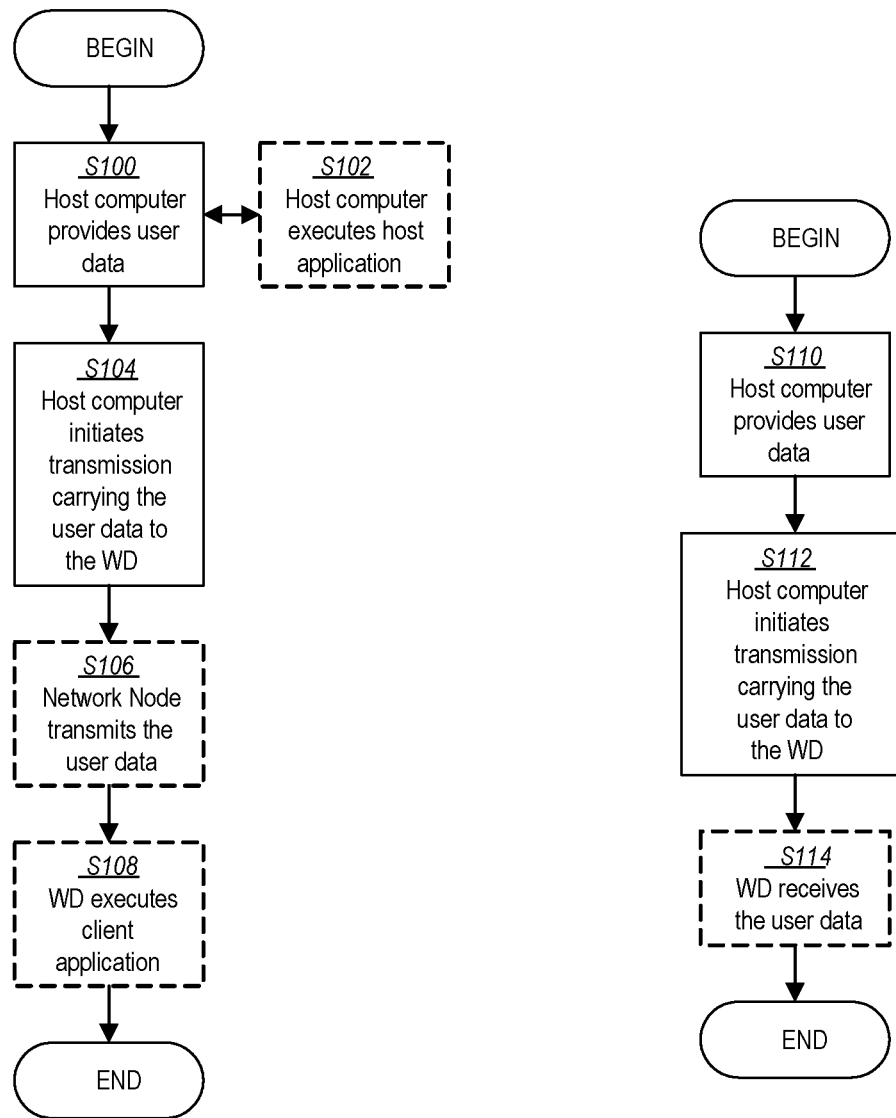
FIG. 7 is a flowchart illustrating exemplary methods implemented in a communication system including a host computer, a network node and a wireless device for executing a client application at a wireless device according to some embodiments of the present disclosure.
FIG. 8 is a flowchart illustrating exemplary methods implemented in a communication system including a host computer, a network node and a wireless device for receiving user data at a wireless device according to some embodiments of the present disclosure.

FIG. 7 is a flowchart illustrating an exemplary method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 8 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 9 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 10 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 11:
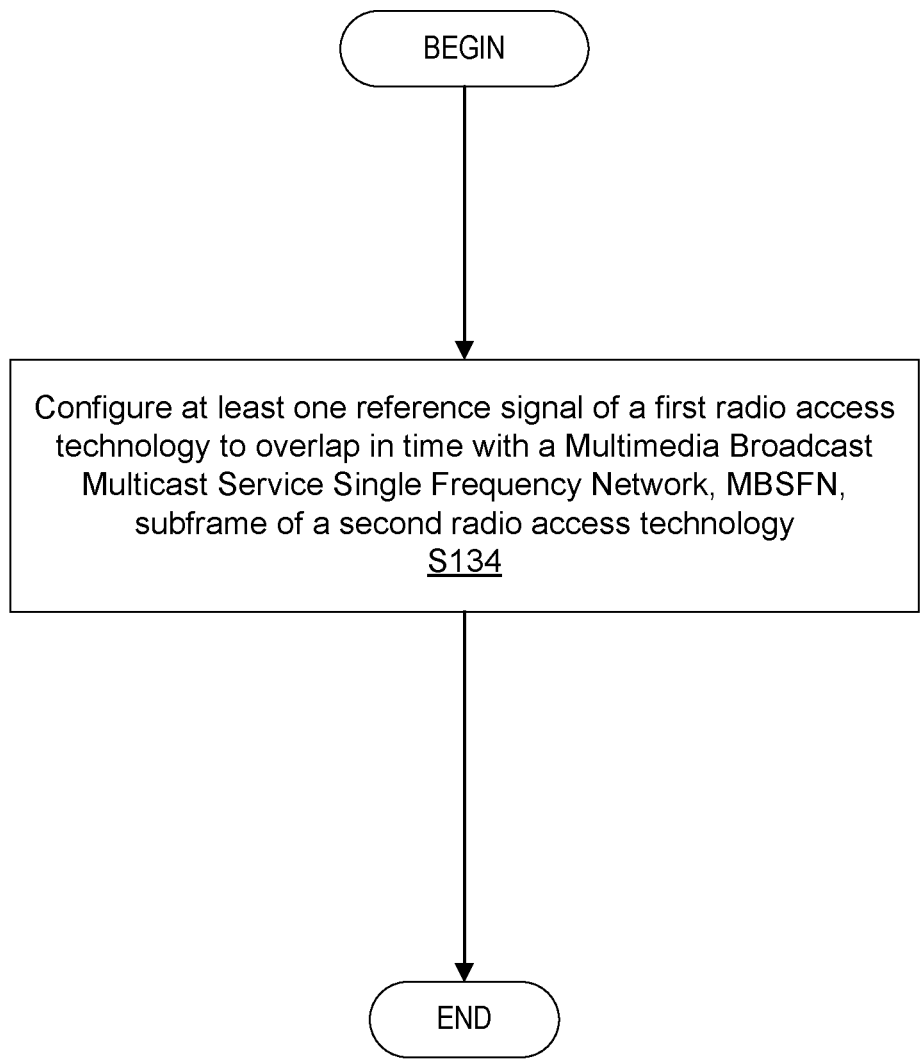
FIG. 11 is a flowchart of an exemplary process in a network node for configuration unit according to some embodiments of the present disclosure.

FIG. 11 is a flowchart of an exemplary process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, communication interface 60, radio interface 62, etc. according to the example method, which includes configuring (Block S134), such as via the configuration unit 32, at least one reference signal of a first radio access technology to overlap in time with a Multimedia Broadcast Multicast Service Single Frequency Network, MBSFN, subframe of a second radio access technology.

In some embodiments, the method further includes transmitting, such as via radio interface 62, the at least one reference signal on radio resources according to the configured overlap in time; and/or receiving feedback based on measurements of the at least one reference signal on the radio resources. In some embodiments, the at least one reference signal includes at least one of a channel state information reference signal, CSI-RS, and a tracking reference signal, TRS. In some embodiments, the at least one reference signal of the first radio access technology includes a synchronization signal block, SSB. In some embodiments, the first radio access technology is Third Generation Partnership Project, 3GPP, New Radio, NR, and/or the second radio access technology is Third Generation Partnership Project, 3GPP, Long Term Evolution, LTE. In some embodiments, the overlap in time is an overlap of at least one slot defined by the first radio access technology and at least one subframe defined by the second radio access technology. In some embodiments, the method further includes configuring, such as via configuration unit 32, a synchronization signal block, SSB, of the first radio access technology to overlap in time with the MBSFN subframe of the second radio access technology; and transmitting, such as via radio interface 62, the SSB on radio resources according to the configured overlap in time.

In some embodiments, configuring the at least one reference signal of the first radio access technology to overlap in time with the MBSFN subframe of the second radio access technology further includes configuring, such as via configuration unit 32, processing circuitry 68, processor 70, communication interface 60 and/or radio interface 62, the at least one reference signal of the first radio access technology in at least one slot defined by the first radio access technology to overlap with at least one subframe defined by the second radio access technology. In some embodiments, configuring the at least one reference signal of the first radio access technology to overlap in time with the MBSFN subframe of the second radio access technology further includes configuring, such as via configuration unit 32, processing circuitry 68, processor 70, communication interface 60 and/or radio interface 62, the at least one reference signal of the first radio access technology in one of one slot and at least two slots defined by the first radio access technology to overlap with one subframe defined by the second radio access technology, the one of the one slot and the at least two slots being based at least in part on a subcarrier spacing that is used for the first radio access technology.

In some embodiments, the method further includes configuring, such as via configuration unit 32, processing circuitry 68, processor 70, communication interface 60 and/or radio interface 62, a synchronization signal block, SSB, of the first radio access technology to overlap in time with the MBSFN subframe of the second radio access technology; and transmitting, such as via configuration unit 32, processing circuitry 68, processor 70, communication interface 60 and/or radio interface 62, the SSB on at least one radio resource according to the configured overlap in time. In some embodiments, the configuration of the at least one reference signal of the first radio access technology to overlap in time with the MBSFN subframe of the second radio access technology is further configured to, such as via configuration unit 32, processing circuitry 68, processor 70, communication interface 60 and/or radio interface 62, avoid a collision of the at least one reference signal of the first radio access technology with at least one of: a cell-specific reference signal, CRS, of the second radio access technology; and signaling on one of a first one and a first two orthogonal frequency division multiplexing, OFDM, symbols of the MBSFN subframe of the second radio access technology.

Figure 12:
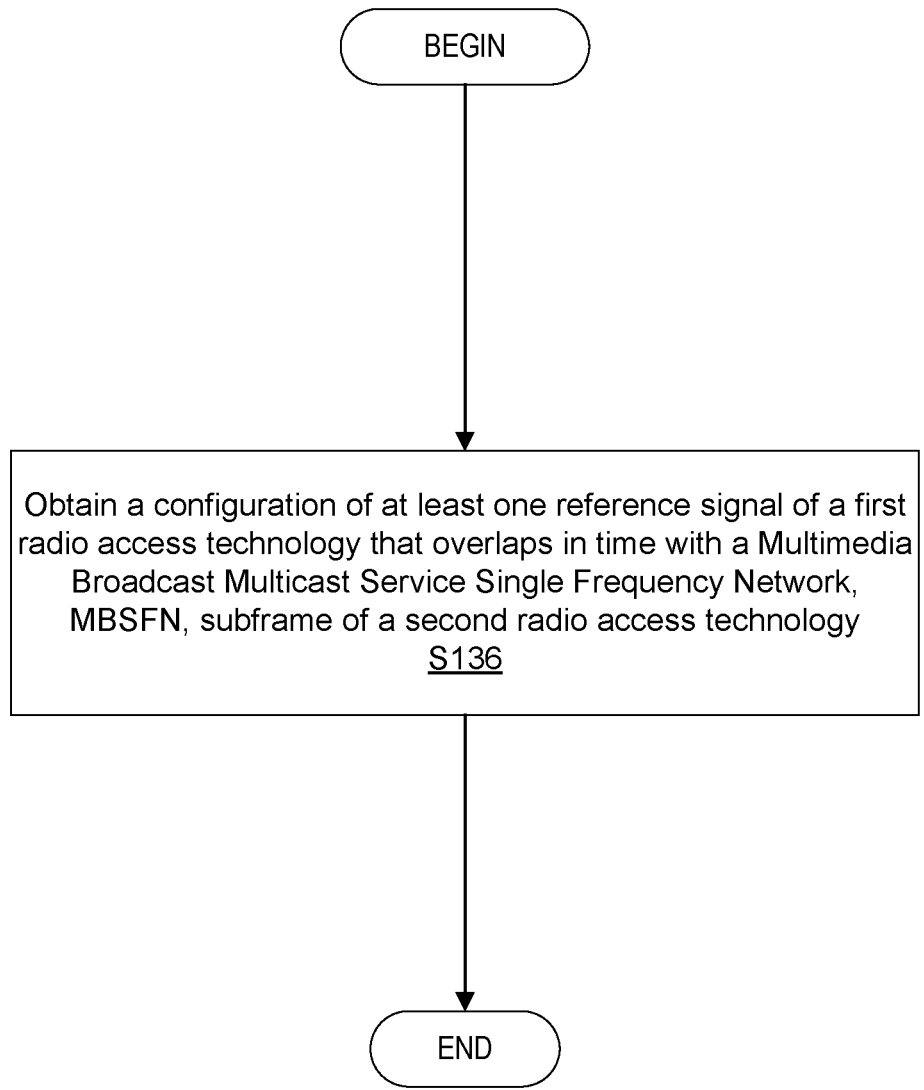
FIG. 12 is a flowchart of an exemplary process in a wireless device for receiver unit according to some embodiments of the present disclosure.
Figure 13:
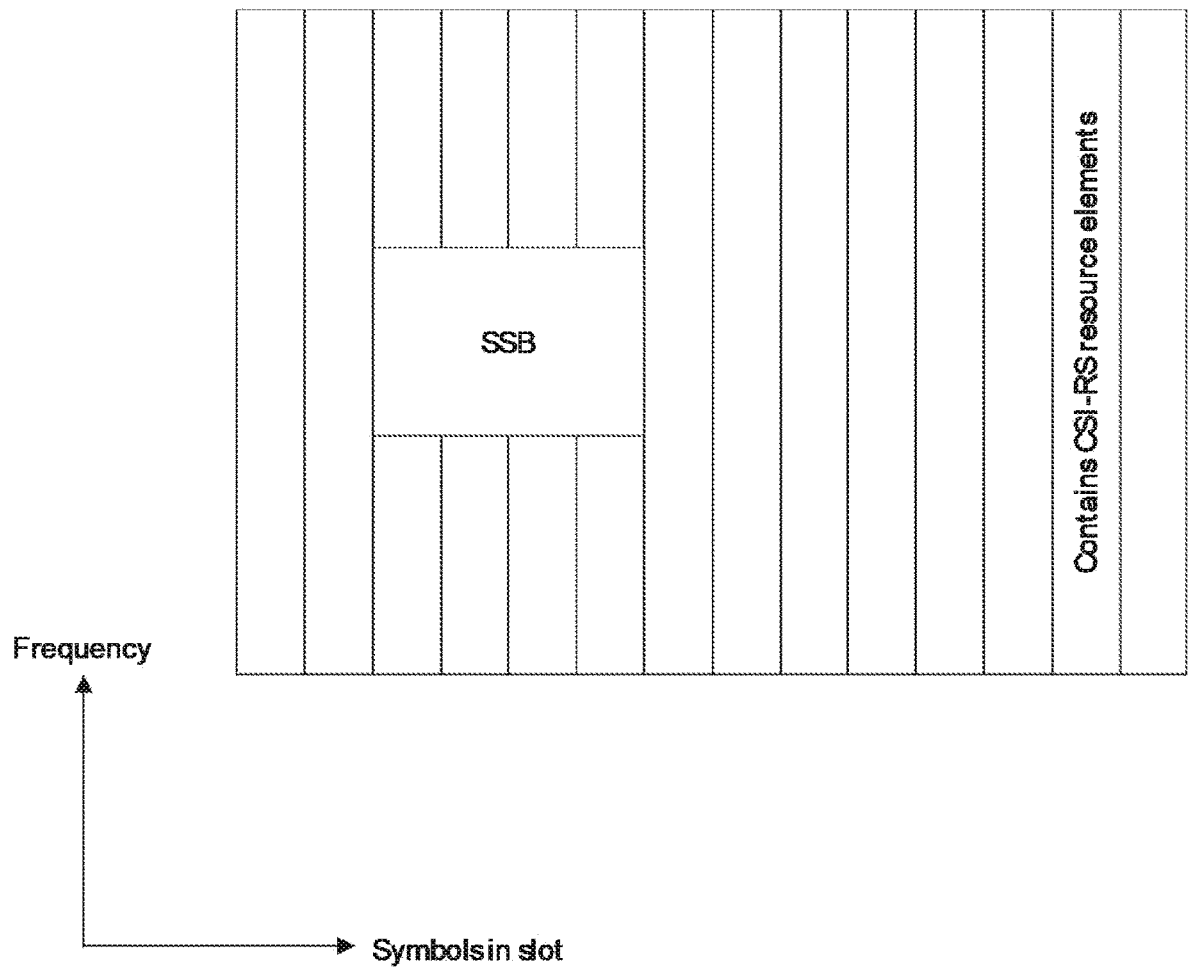
FIG. 13 illustrates an example configuration of SSB and CSI-RS in a slot according to some embodiments of the present disclosure.

FIG. 12 is a flowchart of an exemplary process in a wireless device 22 according to some embodiments of the present disclosure. One or more Blocks and/or functions and/or methods performed by WD 22 may be performed by one or more elements of WD 22 such as by receiver unit 34 in processing circuitry 84, processor 86, radio interface 82, etc., which example method includes obtaining (Block S136), such as via receiver unit 34 and/or processing circuitry 84 and/or radio interface 82, a configuration of at least one reference signal of a first radio access technology that overlaps in time with a Multimedia Broadcast Multicast Service Single Frequency Network, MBSFN, subframe of a second radio access technology.

In some embodiments, the method further includes receiving, such as via radio interface 82, and/or performing, such as via processing circuitry 84 and/or receiver unit 34, measurements of the at least one reference signal on at least one radio resource according to the configured overlap in time. In some embodiments, the at least one reference signal includes at least one of a channel state information reference signal, CSI-RS, and a tracking reference signal, TRS. In some embodiments, the at least one reference signal of the first radio access technology includes a synchronization signal block, SSB. In some embodiments, the first radio access technology is Third Generation Partnership Project, 3GPP, New Radio, NR, and/or the second radio access technology is Third Generation Partnership Project, 3GPP, Long Term Evolution, LTE. In some embodiments, the overlap in time is an overlap of at least one slot defined by the first radio access technology and at least one subframe defined by the second radio access technology. In some embodiments, the overlap in time is an overlap of the at least one reference signal of the first radio access technology in one of one slot and at least two slots defined by the first radio access technology with one subframe defined by the second radio access technology, the one of the one slot and the at least two slots being based at least in part on a subcarrier spacing that is used for the first radio access technology.

In some embodiments, the method further includes obtaining, such as via receiver unit 34, processing circuitry 84, processor 86 and/or radio interface 82, a configuration of a synchronization signal block, SSB, of the first radio access technology to overlap in time with the MBSFN subframe of the second radio access technology; and receiving, such as via radio interface 82, receiver unit 34, processing circuitry 84 and/or processor 86, the SSB on at least one radio resource according to the configured overlap in time. In some embodiments, the overlap in time is configured to avoid a collision of the at least one reference signal of the first radio access technology with at least one of: a cell-specific reference signal, CRS, of the second radio access technology; and signaling on one of a first one and a first two orthogonal frequency division multiplexing, OFDM, symbols of the MBSFN subframe of the second radio access technology.

Having described some embodiments related to MBSFN subframe usage for LTE-New Radio spectrum sharing according to the techniques provided in this disclosure, a more detailed description of some of the embodiments is described below, which may be implemented by one or more of the wireless device 22 and network node 16.

In some embodiments, a reference signal of a first radio access technology (RAT), such as, NR CSI-RS and/or TRS are placed, by network node 16, (scheduled, allocated and/or configured) in a time resource, such as an NR slot, that overlaps in time with a Multimedia Broadcast Multicast Service Single Frequency Network, MBSFN, subframe of a second RAT different from the first RAT, such as, an LTE MBSFN subframe. In some aspects, this may be especially beneficial if an LTE MBSFN subframe is configured to overlap in time with an NR slot carrying NR SSB (to avoid CRS-SSB collisions). In this case the same MBSFN subframe is reused, i.e. no additional overhead is introduced. Expressed differently, in some embodiments, CSI-RS and/or TRS are configured, e.g. by network node 16, to appear in the same slots as SSB (possibly in sub- or super-sets of slots, depending on CSI-RS/TRS periodicity).

In some embodiments, SSB occurs every 20 ms. If this is too infrequent for CSI-RS, at least some CSI-RS may be configured in the same slots as SSB. If CSI-RS periodicity is smaller than 20 ms it may be preferable to configure (e.g., by network node 16) the CSI-RS periodicity such that 20 ms is the Least Common Multiple (LCM) of CSI-RS periodicity and 20 ms, i.e. 20 ms may be integer dividable by the CSI-RS periodicity. For CSI-RS periodicity larger than 20 ms, it may be preferable, in some embodiments, if CSI-RS periodicity is an integer dividable by 20 ms.

In NR, CSI-RS slot periodicity and slot offset are configured via radio resource control (RRC) parameter CSI-ResourcePeriodicityAndOffset of the CSI resource (e.g., by network node 16). This parameter may be set so that 1) CSI-RS and SSB occur in the same slot (e.g., if SSB and CSI-RS have different periodicities CSI-RS and SSB may not always occur in pairs) and/or 2) CSI-RS and SSB periodicity have an LCM of 20 ms (CSI-RS periodicity 20 ms), or CSI-RS periodicity being integer dividable by 20 ms (CSI-RS periodicity 20 ms).

In some embodiments, SBB and CSI-RS should not collide in the slot, i.e. different resource elements in the slot are used for SSB and CSI-RS. The placement (scheduling, allocation and/or configuration by e.g., network node) of CSI-RS may be flexible and multiple positions may be possible. One possible example configuration is between TRS symbols (e.g., symbols 7, 8, 9 when TRS is in symbols 6 and 10 for example), or after TRS, i.e., after symbol 10 of a slot (symbol counting starts with symbol 0). For an example configuration see FIG. 13, where a configuration of SSB and CSI-RS in a slot (the symbol with CSI-RS may also contain other NR signals or NR physical channels).

In some embodiments, a configuration for TRS periodicity is every 20, 40, or 80 ms. In case TRS occurs every 20 ms—i.e. the same periodicity as SSB—TRS may be configured in the same slots as SSB. If TRS periodicity is 40 ms, TRS may be configured to occur in every second slot carrying SSB, and so on. For TRS periodicity larger than 20 ms, it may be preferable if TRS periodicity is an integer dividable by 20 ms. If TRS periodicity is smaller than 20 ms, it may be preferable to configure the TRS periodicity such that 20 ms is a LCM of TRS periodicity and 20 ms, i.e., 20 ms may be integer dividable by the TRS periodicity.

In NR, TRS may be configured by network node 16 via a special CSI-RS resource (TRS may actually be considered a type of CSI-RS reference signal that are configured to be used for tracking). TRS slot periodicity and slot offset are configured via RRC parameter CSI-ResourcePeriodicity-AndOffset of the CSI resource used for tracking. This parameter may be set (e.g., by network node 16) so that 1) CSI-RS (used for tracking) and SSB occur in the same slot (if SSB and CSI-RS have different periodicities CSI-RS and SSB may not always occur in pairs) and/or 2) CSI-RS (used for tracking) and SSB periodicity have an LCM of 20 ms (CSI-RS periodicity 20 ms), or CSI-RS periodicity is integer dividable by 20 ms (CSI-RS periodicity 20 ms).

Figure 14:
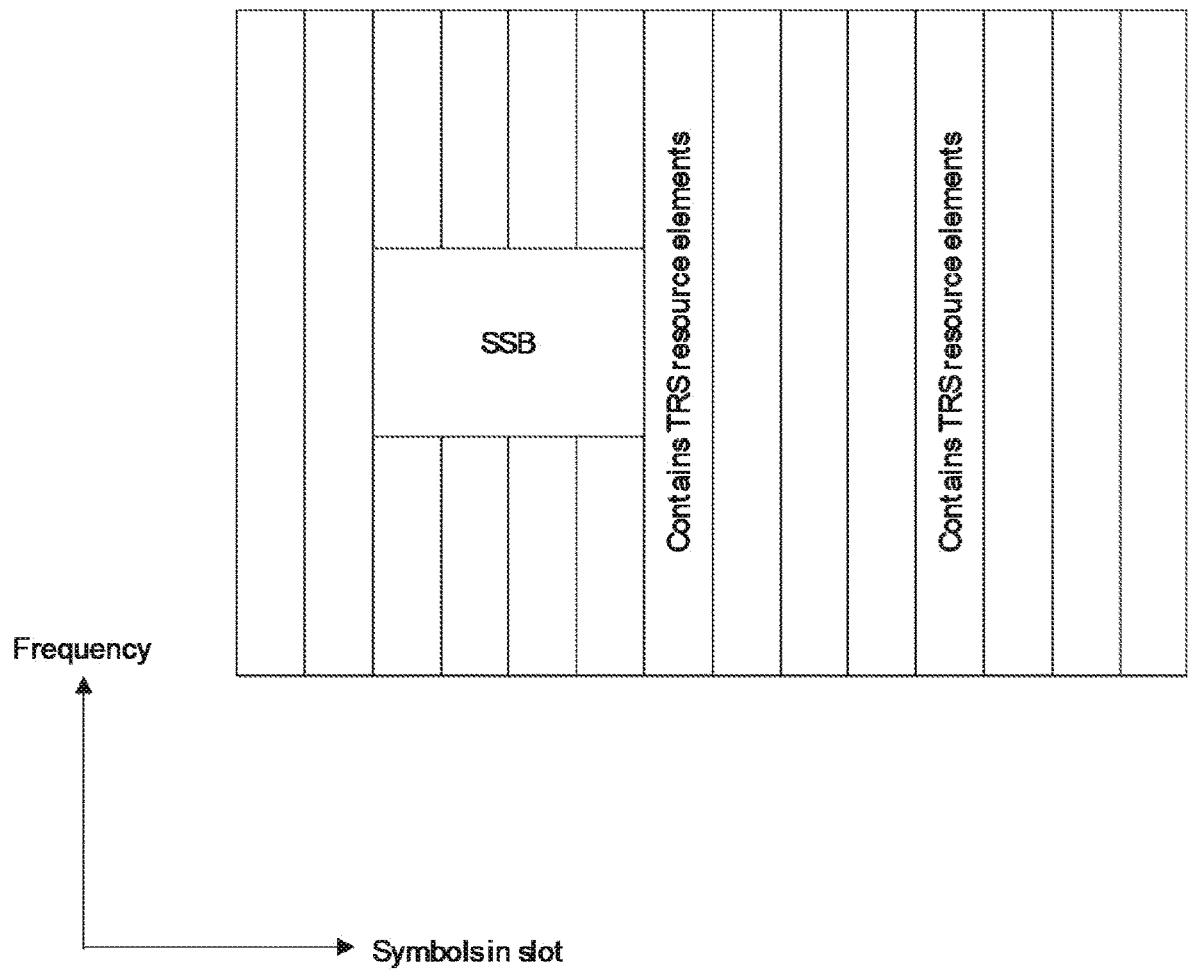
FIG. 14 illustrates an example configuration of SSB and TRS in a slot according to some embodiments of the present disclosure.

In some embodiments, SBB and TRS should not collide in the slot, i.e. different resource elements are used for SSB and TRS. For example, when SSB uses symbols 2-5 a possible choice for TRS is symbols 6 and 10 (symbol counting starts with symbol 0) as shown in FIG. 14. Note, TRS occupies two slots (with the same symbol allocation in each slot) and this solution may be application for only for one of the slots. FIG. 14 illustrates an example configuration of SSB and TRS in a slot (the symbols with TRS may also contain other NR signals or NR physical channels).

Figure 15:
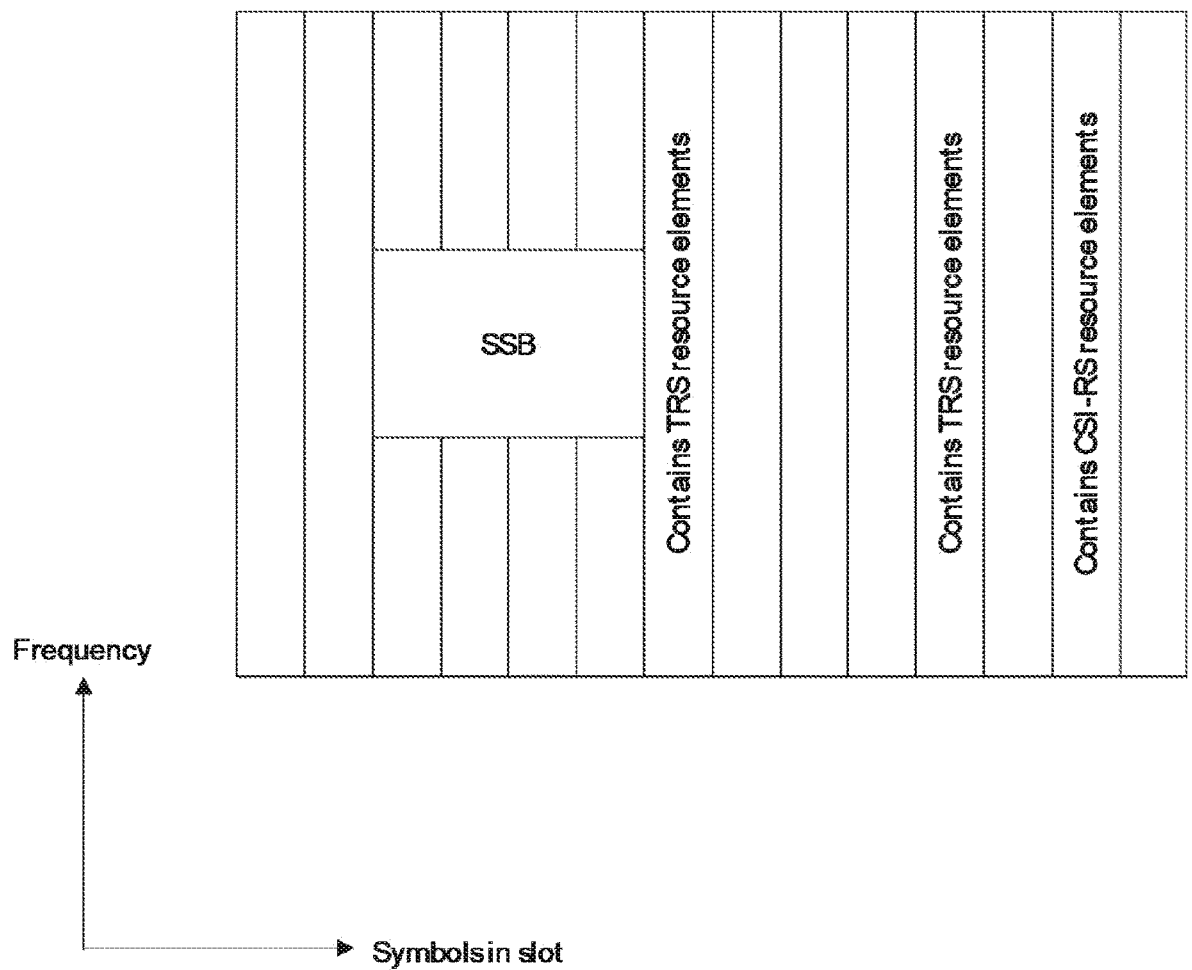
FIG. 15 illustrates an example configuration of SSB, CSI-RS, and TRS in a slot according to some embodiments of the present disclosure.

In some embodiments, when SSB, CSI-RS, and TRS are sent in the same slot proper configuration may ensure that no collisions between these signals occur (e.g., are not scheduled in the same symbol). For example, as shown in FIG. 15 for example, the CSI-RS is in symbol 12 and TRS is in symbols {6, 10} (symbol counting starts with symbol 0).

In some embodiments, the CSI-RS and TRS are configured (e.g., by network node 16) in the same slot (but not SSB) overlapping an LTE MBSFN subframe.

Nevertheless, in some use cases, a preferred solution is that also SSB occurs or is configured in the same slot as CSI-RS and TRS. FIG. 15 illustrates an example configuration of SSB, CSI-RS, and TRS in a slot (the symbols with CSI-RS and TRS may also contain other NR signals or NR physical channels).

Different Numerologies Between NR and LTE

Figure 16:
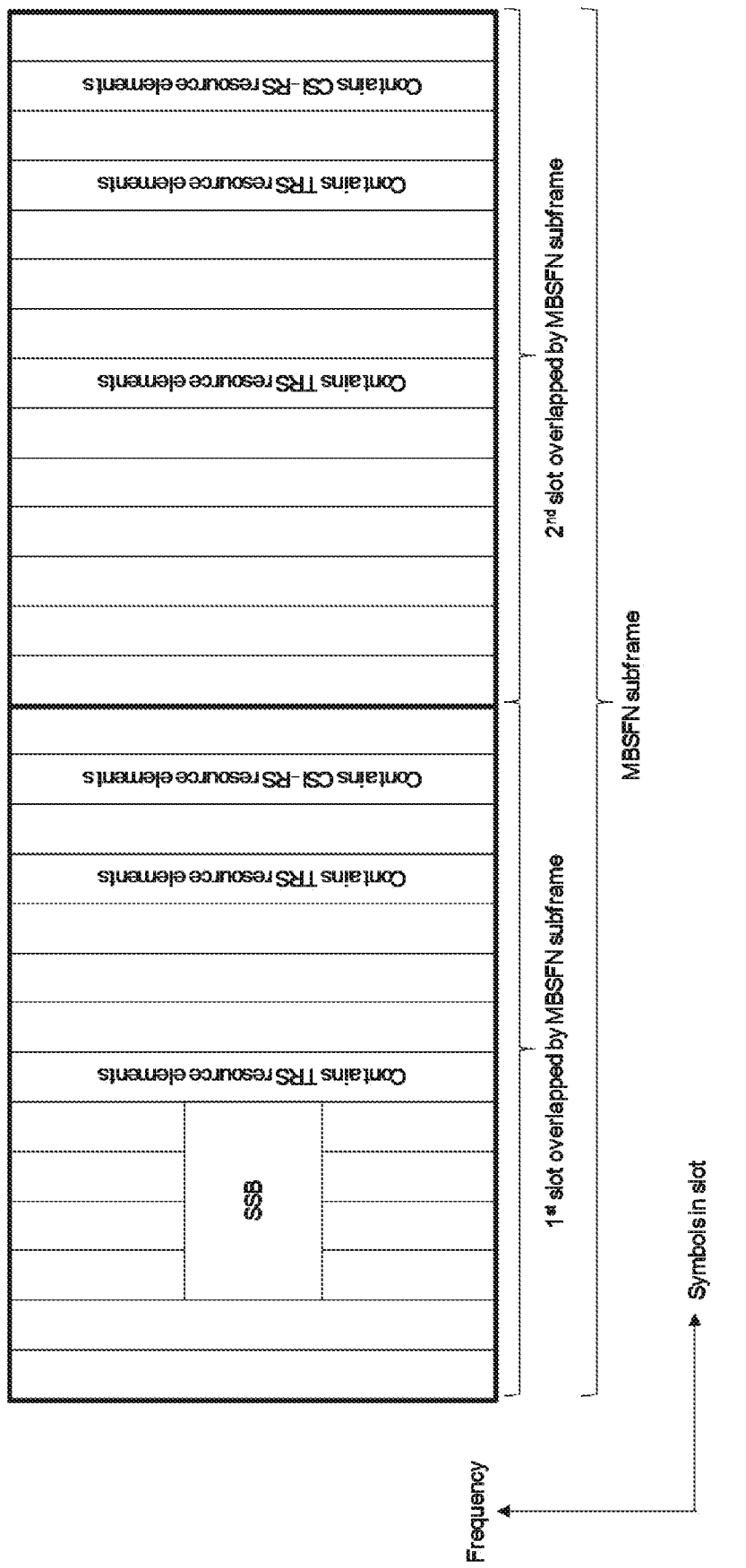
FIG. 16 illustrates another example configuration of SSB, CSI-RS, and TRS in a slot according to some embodiments of the present disclosure.

In case NR uses a higher numerology (subcarrier spacing) than LTE, e.g., 30 kHz, the duration of an NR slot may become shorter, e.g., 0.5 ms for 30 kHz. In this case one LTE (MSBFN) subframe can cover (or can overlap) two NR slots. Thus, NR signals can be allocated (e.g., by network node 16) to both NR slots that are overlapped by a single LTE MBFSN subframe. Each NR slot can carry any (or a mixture of) SSB, TRS, CSI-RS in some such embodiments. FIG. 16 shows an example where the first slot carries SSB, a first part of TRS, and CSI-RS and the second slot carries the second part of TRS and CSI-RS. FIG. 16 shows an example configuration (e.g., by network node 16) of SSB, CSI-RS, and TRS in a slot (the symbols with CSI-RS and TRS may also contain other NR signals or NR physical channels) and shows an example where NR uses 30 kHz subcarrier spacing, and one LTE MBSFN subframe therefore overlaps two NR slots.

Figure 17:
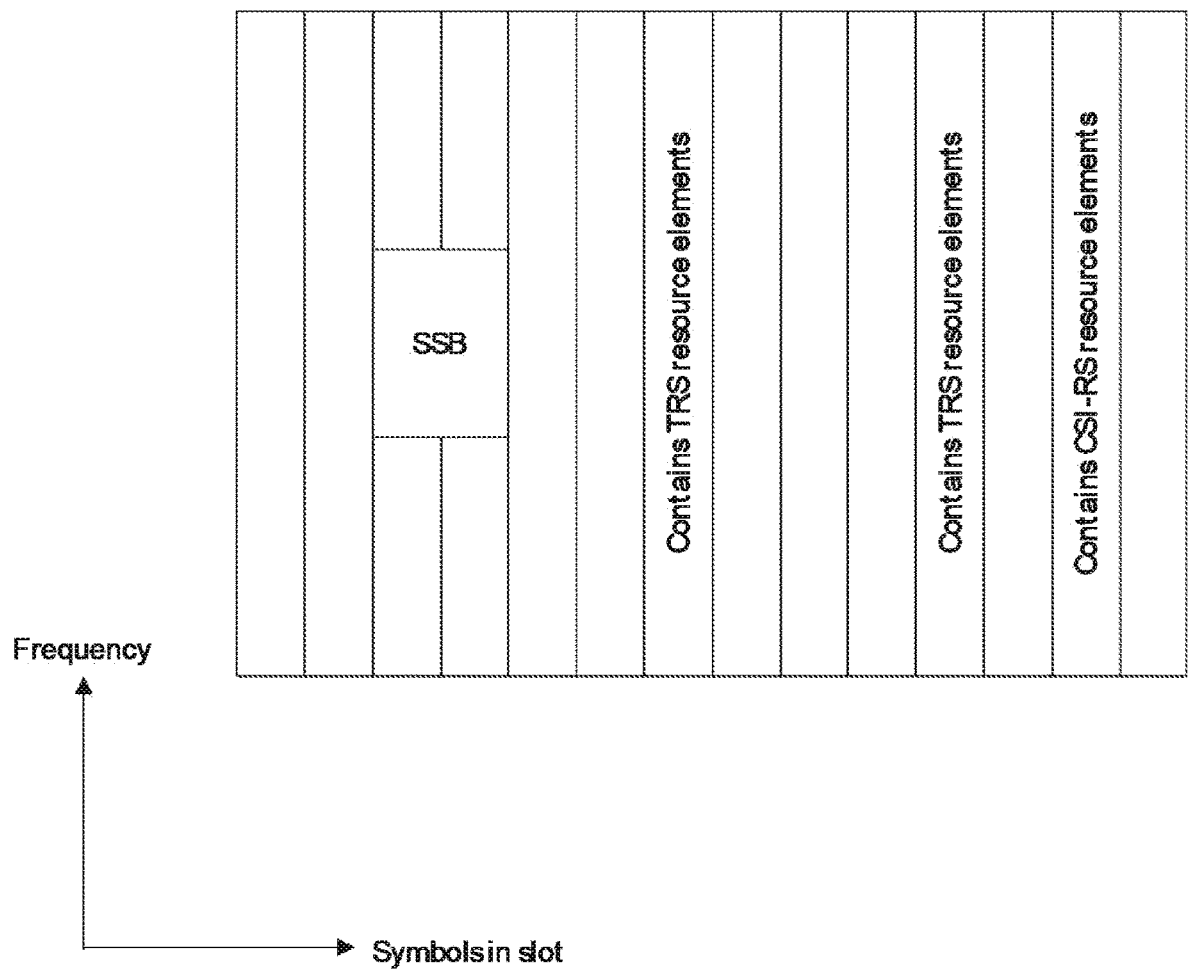
FIG. 17 illustrates yet another example configuration of SSB, CSI-RS, and TRS in a slot according to some embodiments of the present disclosure.

NR supports mixed numerologies, i.e. some of the NR signals that overlap an LTE MBSFN subframe could be based on subcarrier spacing 1 (numerology 1) while others on subcarrier spacing 2 (numerology 2). For example, data, CSI-RS, and TRS could be based on 15 kHz while SSB would be based on 30 kHz. This case is shown as an example in FIG. 17. In this example, because data is based on 15 kHz subcarrier spacing the NR slot length is 1 ms, i.e. the same as the LTE subframe duration. SSB with 30 kHz spans only two 15 kHz symbols. Thus, FIG. 17 illustrates an example configuration (e.g., by network node 16) of SSB, CSI-RS, and TRS in a slot (the symbols with CSI-RS and TRS may also contain other NR signals or NR physical channels), where the SSB uses 30 kHz subcarrier spacing and thus spans two 15 kHz symbol durations and since NR data is based on 15 kHz the NR slot duration is 1 ms, i.e., the same as an LTE MBSFN subframe duration.

It is noted that the techniques in this disclosure may be applied to both frequency division duplex (FDD) DL and time division duplex (TDD) implementations.

Thus, some embodiments of this disclosure provide for the transmission of NR CSI-RS and/or TRS in slots overlapping LTE MBSFN subframes. This may be particularly beneficial when an LTE MBSFN subframe is used to avoid collisions with NR SSB; in this case the same MBSFN subframe can be reused for overlapping CSI-RS and/or TRS, as well as, SSB.

In addition, some embodiments may include one or more of the following:

Embodiment A1. A network node configured to communicate with a wireless device (WD), the network node configured to, and/or comprising a radio interface and/or comprising processing circuitry configured to:

configure at least one reference signal of a first radio access technology to overlap in time with a Multimedia Broadcast Multicast Service Single Frequency Network, MBSFN, subframe of a second radio access technology.

Embodiment A2. The network node of Embodiment A1, wherein the processing circuitry is further configured to:

transmit the at least one reference signal on radio resources according to the configured overlap in time; and/or receive feedback based on measurements of the at least one reference signal on the radio resources.

Embodiment A3. The network node of any one of Embodiments A1 and A2, wherein the at least one reference signal includes at least one of a channel state information reference signal, CSI-RS, and a tracking reference signal, TRS.

Embodiment A4. The network node of any one of Embodiments A1-A3, wherein the first radio access technology is New Radio, NR, and/or the second radio access technology is Long Term Evolution, LTE.

Embodiment A5. The network node of any one of Embodiments A1-A4, wherein the overlap in time is an overlap of at least one slot defined by the first radio access technology and at least one subframe defined by the second radio access technology.

Embodiment A6. The network node of any one of Embodiments A1-A5, wherein the processing circuitry is further configured to:

configure a synchronization signal block, SSB, of the first radio access technology to overlap in time with the MBSFN subframe of the second radio access technology; and transmit the SSB on radio resources according to the configured overlap in time.

Embodiment B1. A method implemented in a network node, the method comprising:

configuring at least one reference signal of a first radio access technology to overlap in time with a Multimedia Broadcast Multicast Service Single Frequency Network, MBSFN, subframe of a second radio access technology.

Embodiment B2. The method of Embodiment B1, further comprising:

transmitting the at least one reference signal on radio resources according to the configured overlap in time; and/or receiving feedback based on measurements of the at least one reference signal on the radio resources.

Embodiment B3. The method of any one of Embodiments B1 and B2, wherein the at least one reference signal includes at least one of a channel state information reference signal, CSI-RS, and a tracking reference signal, TRS.

Embodiment B4. The method of any one of Embodiments B1-B3, wherein the first radio access technology is New Radio, NR, and/or the second radio access technology is Long Term Evolution, LTE.

Embodiment B5. The method of any one of Embodiments B1-B4, wherein the overlap in time is an overlap of at least one slot defined by the first radio access technology and at least one subframe defined by the second radio access technology.

Embodiment B6. The method of any one of Embodiments B1-B5, further comprising:

configuring a synchronization signal block, SSB, of the first radio access technology to overlap in time with the MBSFN subframe of the second radio access technology; and transmitting the SSB on radio resources according to the configured overlap in time.

Embodiment C1. A wireless device (WD) configured to communicate with a network node, the WD configured to, and/or comprising a radio interface and/or processing circuitry configured to:

obtain a configuration of at least one reference signal of a first radio access technology that overlaps in time with a Multimedia Broadcast Multicast Service Single Frequency Network, MBSFN, subframe a second radio access technology.

Embodiment C2. The WD of Embodiment C1, wherein the processing circuitry is further configured to:

receive and/or perform measurements of the at least one reference signal on radio resources according to the configured overlap in time.

Embodiment C3. The WD of any one of Embodiments C1 and C2, wherein the at least one reference signal includes at least one of a channel state information reference signal, CSI-RS, and a tracking reference signal, TRS.

Embodiment C4. The WD of any one of Embodiments C1-C3, wherein the first radio access technology is New Radio, NR, and/or the second radio access technology is Long Term Evolution, LTE.

Embodiment C5. The WD of any one of Embodiments C1-C4, wherein the overlap in time is an overlap of at least one slot defined by the first radio access technology and at least one subframe defined by the second radio access technology.

Embodiment C6. The WD of any one of Embodiments C1-05, wherein the processing circuitry is further configured to:

obtain a configuration of a synchronization signal block, SSB, of the first radio access technology to overlap in time with the MBSFN subframe of the second radio access technology; and receive the SSB on radio resources according to the configured overlap in time.

Embodiment D1. A method implemented in a wireless device (WD), the method comprising:

obtaining a configuration of at least one reference signal of a first radio access technology that overlaps in time with a Multimedia Broadcast Multicast Service Single Frequency Network, MBSFN, subframe of a second radio access technology.

Embodiment D2. The method of Embodiment D1, further comprising:

receiving and/or performing measurements of the at least one reference signal on radio resources according to the configured overlap in time.

Embodiment D3. The method of any one of Embodiments D1 and D2, wherein the at least one reference signal includes at least one of a channel state information reference signal, CSI-RS, and a tracking reference signal, TRS.

Embodiment D4. The method of any one of Embodiments D1-D3, wherein the first radio access technology is New Radio, NR, and/or the second radio access technology is Long Term Evolution, LTE.

Embodiment D5. The method of any one of Embodiments D1-D4, wherein the overlap in time is an overlap of at least one slot defined by the first radio access technology and at least one subframe defined by the second radio access technology.

Embodiment D6. The method of any one of Embodiments D1-D5, further comprising:

obtaining a configuration of a synchronization signal block, SSB, of the first radio access technology to overlap in time with the MBSFN subframe of the second radio access technology; and receiving the SSB on radio resources according to the configured overlap in time.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| CRS | Cell Specific Reference Signal |
| CSI-RS | Channel State Information Reference Signal |
| DC | Direct Current |
| DL | Downlink |
| DM-RS | Demodulation Reference Signal |
| FDD | Frequency Division Duplex |
| ID | Identity |
| LCM | Least Common Multiple |
| MBSFN | Multimedia Broadcast multicast service Single Frequency Network |
| OFDM | Orthogonal Frequency Division Multiplex |
| PDSCH | Physical Shared Data Channel |
| RRC | Radio Resource Control |
| SSB | Synchronization Signal Block |
| TDD | Time Division Duplex |
| TRS | Tracking Reference Signal |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising processing circuitry, the processing circuitry configured to cause the network node to:
   configure at least one reference signal of a first radio access technology to overlap in time with a Multimedia Broadcast Multicast Service Single Frequency Network, MBSFN, subframe of a second radio access technology, the at least one reference signal of the first radio access technology including a synchronization signal block, SSB, and a channel state information reference signal, CSI-RS.

2. The network node of claim 1, wherein the processing circuitry is further configured to cause the network node to:
   transmit the at least one reference signal on at least one radio resource according to the configured overlap in time; and
   receive feedback based on measurements of the at least one reference signal on the at least one radio resource.

3. The network node of claim 1, wherein the at least one reference signal of the first radio access technology further includes a tracking reference signal, TRS.

4. The network node of claim 1, wherein the first radio access technology is Third Generation Partnership Project, 3GPP, New Radio, NR, and the second radio access technology is 3GPP Long Term Evolution, LTE.

5. The network node of claim 1, wherein the processing circuitry is further configured to cause the network node to configure the at least one reference signal of the first radio access technology to overlap in time with the MBSFN subframe of the second radio access technology by being configured to cause the processing circuitry to cause the network node to:
   configure the at least one reference signal of the first radio access technology in at least one slot defined by the first radio access technology to overlap with at least one subframe defined by the second radio access technology.

6. The network node of claim 1, wherein the processing circuitry is further configured to cause the network node to configure the at least one reference signal of the first radio access technology to overlap in time with the MBSFN subframe of the second radio access technology by being configured to cause the processing circuitry to cause the network node to:
   configure the at least one reference signal of the first radio access technology in one of one slot and at least two slots defined by the first radio access technology to overlap with one subframe defined by the second radio access technology, the one of the one slot and the at least two slots being based at least in part on a subcarrier spacing that is used for the first radio access technology.

7. The network node of claim 1, wherein the processing circuitry is further configured to cause the network node to:
   configure a synchronization signal block, SSB, of the first radio access technology to overlap in time with the MBSFN subframe of the second radio access technology; and
   transmit the SSB on at least one radio resource according to the configured overlap in time.

8. The network node of claim 1, wherein the configuration of the at least one reference signal of the first radio access technology to overlap in time with the MBSFN subframe of the second radio access technology is further configured to cause the network node to:
   avoid a collision of the at least one reference signal of the first radio access technology with at least one of:
      a cell-specific reference signal, CRS, of the second radio access technology; and
      signaling on one of a first one and a first two orthogonal frequency division multiplexing, OFDM, symbols of the MBSFN subframe of the second radio access technology.

9. A wireless device, WD, configured to communicate with a network node, the wireless device comprising processing circuitry, the processing circuitry configured to cause the wireless device to:
   obtain a configuration of at least one reference signal of a first radio access technology to overlap in time with a Multimedia Broadcast Multicast Service Single Frequency Network, MBSFN, subframe of a second radio access technology, the at least one reference signal of the first radio access technology including a synchronization signal block, SSB, and a channel state information reference signal, CSI-RS.

10. The wireless device of claim 9, wherein the processing circuitry is further configured to cause the wireless device to:

receive and/or perform measurements of the at least one reference signal on at least one radio resource according to the configured overlap in time.

11. The wireless device of claim 9, wherein the at least one reference signal of the first radio access technology further includes a tracking reference signal, TRS.

12. The wireless device of claim 9, wherein the first radio access technology is Third Generation Partnership Project, 3GPP, New Radio, NR, and/or the second radio access technology is Third Generation Partnership Project, 3GPP, Long Term Evolution, LTE.

13. The wireless device of claim 9, wherein the overlap in time is an overlap of the at least one reference signal in at least one slot defined by the first radio access technology with at least one subframe defined by the second radio access technology.

14. A method implemented in a network node configured to communicate with a wireless device, the method comprising:

configuring at least one reference signal of a first radio access technology to overlap in time with a Multimedia Broadcast Multicast Service Single Frequency Network, MBSFN, subframe of a second radio access technology, the at least one reference signal of the first radio access technology including a synchronization signal block, SSB, and a channel state information reference signal, CSI-RS.

15. A method implemented in a wireless device, WD, configured to communicate with a network node, the method comprising:

obtaining a configuration of at least one reference signal of a first radio access technology to overlap in time with a Multimedia Broadcast Multicast Service Single Frequency Network, MBSFN, subframe of a second radio access technology, the at least one reference signal of the first radio access technology including a synchronization signal block, SSB, and a channel state information reference signal, CSI-RS.

\* \* \* \* \*